US012640501B2

(12) United States Patent
Takeuchi et al.

(10) Patent No.: US 12,640,501 B2
(45) Date of Patent: May 26, 2026

(54) CONNECTOR WITH DUAL INNER-WALL GUIDE STRUCTURE AND WIRE RECEIVING SPACE FOR REPAIRABILITY

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shunya Takeuchi, Mie (JP); Teruo Hara, Mie (JP); Hajime Matsui, Mie (JP); Masaaki Tabata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 289 days.

(21) Appl. No.: 18/287,279

(22) PCT Filed: Mar. 18, 2022

(86) PCT No.: PCT/JP2022/012617
§ 371 (c)(1),
(2) Date: Oct. 17, 2023

(87) PCT Pub. No.: WO2022/230439
PCT Pub. Date: Nov. 3, 2022

(65) Prior Publication Data

US 2024/0204426 A1 Jun. 20, 2024

(30) Foreign Application Priority Data

Apr. 27, 2021 (JP) ................................ 2021-075243

(51) Int. Cl.
*H01R 4/10* (2006.01)
*H01R 13/502* (2006.01)
(Continued)

(52) U.S. Cl.
CPC ............. *H01R 4/10* (2013.01); *H01R 13/502* (2013.01); *H01R 13/631* (2013.01); *H01R 13/639* (2013.01)

(58) Field of Classification Search
CPC ...... H01R 4/10; H01R 13/502; H01R 13/631; H01R 13/639; H01R 11/05; H01R 4/5066; H01R 13/4368
See application file for complete search history.

(56) References Cited

U.S. PATENT DOCUMENTS 6,129,574 A * 10/2000 Okayasu ............. H01R 13/506 439/459
6,375,501 B1 * 4/2002 Kojima ................. H01R 43/22 439/752.5

(Continued)

FOREIGN PATENT DOCUMENTS

JP H09-213401 A 8/1997
JP 2021-077510 A 5/2021

(Continued)

OTHER PUBLICATIONS

International Search Report issued on May 17, 2022 for WO 2022/230439 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

A connector is to be connected to a wire including a core wire and an insulation coating covering an outer periphery of the core wire and extending in a front-rear direction, and provided with a terminal to be connected to the core wire, a connector housing including a terminal accommodating portion for accommodating the terminal inside, and a rear (Continued)

holder to be mounted on a rear part of the connector housing. The terminal includes a core wire insertion opening, into which the core wire is inserted from behind, an electrically connecting portion to be electrically connected to the core wire and a pressing portion for pressing the core wire inserted through the core wire insertion opening and disposed at a position of the electrically connecting portion in the front-rear direction against the electrically connecting portion.

9 Claims, 22 Drawing Sheets

(51) Int. Cl.
*H01R 13/631* (2006.01)
*H01R 13/639* (2006.01)

(56) References Cited

U.S. PATENT DOCUMENTS

| | | | | |
|---|---|---|---|---|
| 11,848,527 | B2 * | 12/2023 | Takeuchi | H01R 4/50 |
| 2019/0252803 | A1 * | 8/2019 | Takeuchi | H01R 13/424 |
| 2021/0126383 | A1 | 4/2021 | Takeuchi et al. | |
| 2022/0239018 | A1 | 7/2022 | Takeuchi et al. | |
| 2022/0247109 | A1 | 8/2022 | Hara et al. | |
| 2024/0204426 | A1 * | 6/2024 | Takeuchi | H01R 13/4368 |
| 2025/0253552 | A1 * | 8/2025 | Takeuchi | H01R 4/48 |
| 2025/0286300 | A1 * | 9/2025 | Takeuchi | H01R 13/639 |

FOREIGN PATENT DOCUMENTS

| | | |
|---|---|---|
| JP | 2021-077512 A | 5/2021 |
| JP | 2021-144871 A | 9/2021 |

* cited by examiner

CONNECTOR WITH DUAL INNER-WALL GUIDE STRUCTURE AND WIRE RECEIVING SPACE FOR REPAIRABILITY

CROSS REFERENCE TO RELATED APPLICATIONS

This application is a national phase of PCT application No. PCT/JP2022/012617, filed on 18 Mar. 2022, which claims priority from Japanese patent application No. 2021-075243, filed on 27 Apr. 2021, all of which are incorporated herein by reference.

TECHNICAL FIELD

The present disclosure relates to a connector.

BACKGROUND

Conventionally, a female terminal described in Japanese Patent Laid-Open Publication No. 2019-145208 (Patent Document 1 below) is known. This female terminal is provided with a terminal body including deformable upper connecting piece and lower connecting piece extending in an extending direction and a slide portion movable in the extending direction with respect to the terminal body. By moving the slide portion with a core wire of a wire disposed between the upper and lower connecting pieces, an upper contact portion and a lower contact portion provided in the slide portion press the upper and lower connecting pieces against the core wire, whereby the terminal body and the wire can be electrically connected. Further, Patent Document 1 below describes a connector provided with a connector housing for accommodating the female terminal and a rear holder to be mounted on a rear end part in the extending direction of the connector housing.

PRIOR ART DOCUMENT

Patent Document

Patent Document 1: JP 2019-145208 A

SUMMARY OF THE INVENTION

Problems to be Solved

The above connector is manufactured as follows. First, the female terminal is accommodated into the connector housing and the rear holder is assembled with the rear end part of the connector housing. In this state, the rear holder is held at a temporary locking position with respect to the connector housing. Then, the wire is inserted through an insertion hole of the rear holder and the core wire of the wire is inserted into the female terminal. At this time, the core wire is disposed between the upper and lower connecting pieces. Subsequently, the slide portion is moved forward with respect to the terminal body, whereby the upper and lower contact portions press the upper and lower connecting pieces against the core wire to connect the female terminal and the wire. Finally, the rear holder is moved to a complete locking position forward of the temporary locking position to retain the female terminal in the connector housing, whereby the manufacturing of the connector is completed.

In manufacturing the above connector, it is considered to provide a guide portion for guiding the insertion of the core wire into the female terminal on the inner wall of the insertion hole of the rear holder in order to reliably insert the core wire into the female terminal. For example, the guide portion is shaped to be located more inward of the insertion hole toward a front side, and guides the core wire into the female terminal by sliding in contact with the core wire.

However, if an attempt is made to move the rear holder rearward from the temporary locking position in the connector provided with the above guide portion, the guide portion possibly interferes with an insulation coating of the wire and the rear holder cannot be moved rearward. That is, it may not be possible to remove the rear holder from the connector. Thus, it becomes difficult to perform a repair operation of the female terminal and the like.

Means to Solve the Problem

A connector of the present disclosure is to be connected to a wire including a core wire and an insulation coating covering an outer periphery of the core wire and extending in a front-rear direction, and provided with a terminal to be connected to the core wire, a connector housing including a terminal accommodating portion for accommodating the terminal inside, and a rear holder to be mounted on a rear part of the connector housing, the terminal including a core wire insertion opening, the core wire being inserted into the core wire insertion opening from behind, an electrically connecting portion to be electrically connected to the core wire and a pressing portion for pressing the core wire inserted through the core wire insertion opening and disposed at a position of the electrically connecting portion in the front-rear direction against the electrically connecting portion, a wire inserting portion being constituted by the connector housing and the rear holder, the wire being inserted into the wire inserting portion, the wire inserting portion including a guide portion for guiding insertion of the core wire into the core wire insertion opening of the terminal accommodated inside the terminal accommodating portion, and the guide portion being constituted by a first inner wall provided in the connector housing and a second inner wall provided in the rear holder.

Effect of the Invention

According to the present disclosure, it is possible to provide a connector, which can guide the insertion of a core wire into a terminal accommodated in a connector housing and from which a rear holder is easily removed.

DETAILED DESCRIPTION TO EXECUTE THE INVENTION

Description of Embodiments of Present Disclosure

Figure 1:
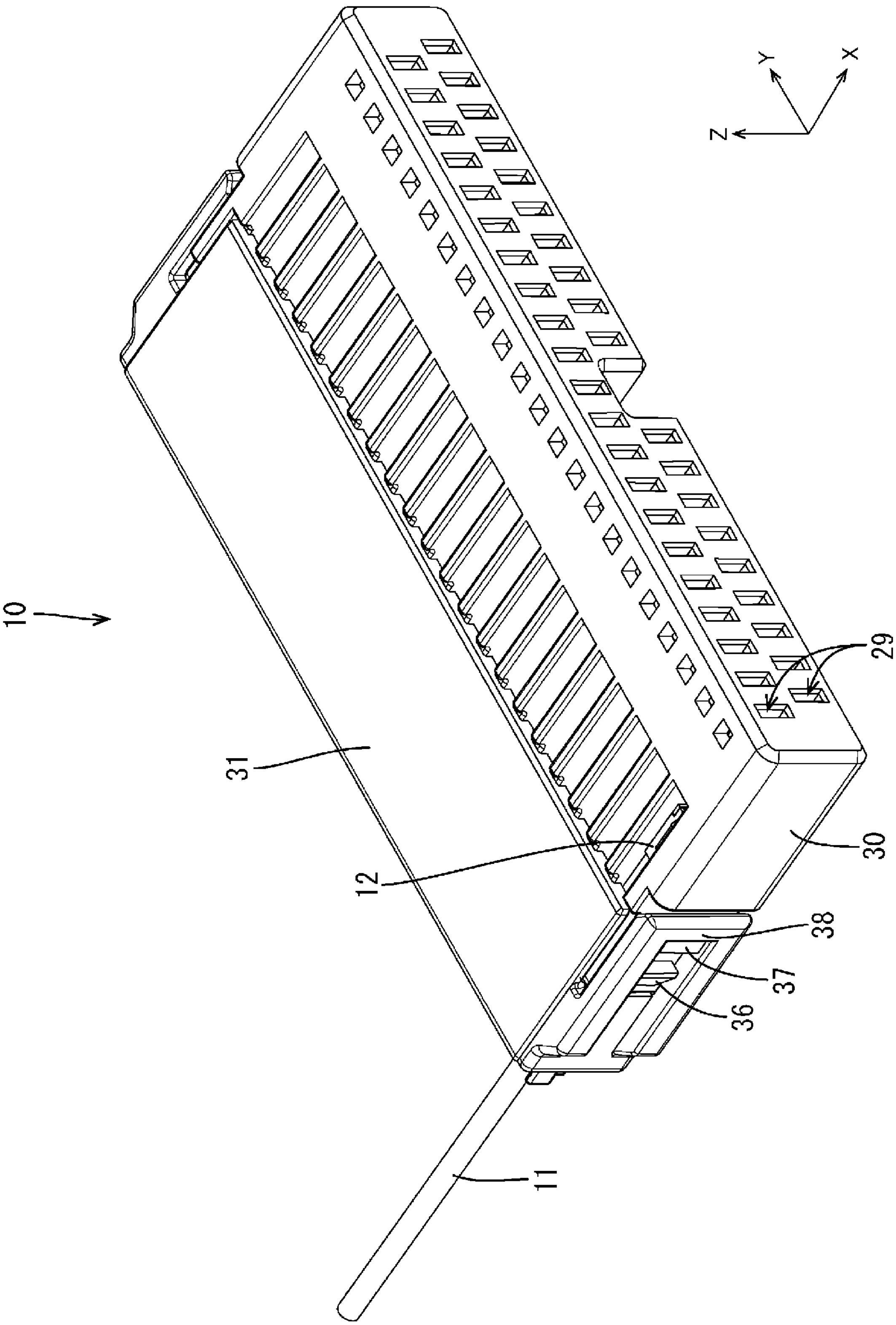
FIG. 1 is a perspective view of a connector according to a first embodiment.

First, embodiments of the present disclosure are listed and described.

(1) The connector of the present disclosure is to be connected to a wire including a core wire and an insulation coating covering an outer periphery of the core wire and extending in a front-rear direction, and provided with a terminal to be connected to the core wire, a connector housing including a terminal accommodating portion for accommodating the terminal inside, and a rear holder to be mounted on a rear part of the connector housing, the terminal including a core wire insertion opening, the core wire being inserted into the core wire insertion opening from behind, an electrically connecting portion to be electrically connected to the core wire and a pressing portion for pressing the core wire inserted through the core wire insertion opening and disposed at a position of the electrically connecting portion in the front-rear direction against the electrically connecting portion, a wire inserting portion being constituted by the connector housing and the rear holder, the wire being inserted into the wire inserting portion, the wire inserting portion including a guide portion for guiding insertion of the core wire into the core wire insertion opening of the terminal accommodated inside the terminal accommodating portion, and the guide portion being constituted by a first inner wall provided in the connector housing and a second inner wall provided in the rear holder.

According to this configuration, the insertion of the core wire into the core wire insertion opening of the terminal accommodated in the connector housing can be guided by the guide portion. Further, since the guide portion is constituted by the first inner wall provided in the connector housing and the second inner wall provided in the rear holder, the rear holder is easily removed from the connector housing.

(2) Preferably, a minimum opening diameter of the guide portion is smaller than an opening diameter of the core wire insertion opening and larger than a diameter of the core wire.

According to this configuration, the core wire is easily guided into the core wire insertion opening by the guide portion.

(3) Preferably, the connector housing has a wire receiving space behind the first inner wall, and interference of the insulation coating of the wire with the second inner wall when the rear holder is moved rearward is suppressed by accommodating the wire into the wire receiving space.

According to this configuration, the rear holder is easily removed from the connector housing by moving the rear holder rearward.

(4) Preferably, at least one of the first and second inner walls includes a conical portion disposed to reduce an opening diameter of the guide portion toward a front side.

According to this configuration, the core wire is easily guided into the core wire insertion opening by the conical portion.

(5) Preferably, at least one of the first and second inner walls has a flat inclined surface disposed to reduce an opening diameter of the guide portion toward a front side and intersecting an axis extending in the front-rear direction, at least one of the connector housing and the rear holder has a locking surface to be locked to a rear end part of the terminal, and the inclined surface and the locking surface are disposed side by side in the front-rear direction.

According to this configuration, since the inclined surface and the locking surface are disposed side by side in the front-rear direction, a shear cross-sectional area of the locking surface by the terminal is easily increased.

(6) Preferably, the terminal is provided with a terminal body including the electrically connecting portion and a slide portion including the core wire insertion opening and the pressing portion and movable in the front-rear direction with respect to the terminal body.

According to this configuration, the electrically connecting portion can be pressed against the core wire and the wire and the terminal can be electrically connected by moving the slide portion in the front-rear direction.

(7) Preferably, the slide portion is movable between a pressing position where the electrically connecting portion is pressed against the core wire by the pressing portion and a separated position disposed rearward of the pressing position, the pressing portion being separated from the electrically connecting portion at the separated position.

According to this configuration, the wire and the terminal can be electrically connected by moving the slide portion from the separated position to the pressing position with respect to the terminal body.

(8) Preferably, the rear holder is movable in the front-rear direction with respect to the connector housing, the rear holder is movable between a temporary locking position where the guide portion is constituted by the first and second inner walls and a complete locking position disposed forward of the temporary locking position, and the rear holder has a locking surface to be locked to a rear end part of the slide portion disposed at the pressing position with the rear holder disposed at the complete locking position.

According to this configuration, since the rear holder is movable in the front-rear direction between the temporary locking position and the complete locking position, the terminal connected to the wire can be locked and retained by moving the slide portion in the front-rear direction.

(9) Preferably, the slide portion is formed into a tubular shape extending in the front-rear direction, and a guiding portion projecting inwardly of the slide portion toward a front side and configured to guide the core wire into the slide portion by sliding in contact with the core wire is provided at a position near a rear end part of the slide portion.

According to this configuration, the core wire can be easily inserted into the slide portion by the guiding portion.

(10) Preferably, the slide portion is provided with a jig contact portion projecting outward, and the slide portion is slid forward by the jig contact portion being pressed from behind by a jig.

According to this configuration, the wire and the terminal can be electrically connected by bringing the jig into contact with the jig contact portion and pressing the slide portion forward.

Details of Embodiment of Present Disclosure

Hereinafter, embodiments of the present disclosure are described. The present disclosure is not limited to these illustrations, but is represented by claims and intended to include all changes in the scope of claims and in the meaning and scope of equivalents.

First Embodiment

A first embodiment of the present disclosure is described with reference to FIGS. 1 to 18. In the following description, a direction indicated by an arrow Z is referred to as an upward direction, a direction indicated by an arrow X is referred to as a forward direction and a direction indicated by an arrow Y is referred to as a leftward direction. Note that, for a plurality of identical members, only some members may be denoted by a reference sign and the other members may not be denoted by the reference sign.

[Connector]

As shown in FIG. 1, a connector 10 according to this embodiment is provided with terminals 12 connected to ends of wires 11, a connector housing 30 including terminal accommodating portions 29 for accommodating the terminals 12 and a rear holder 31 to be mounted on a rear part of the connector housing 30.

[Wire]

Figure 14:
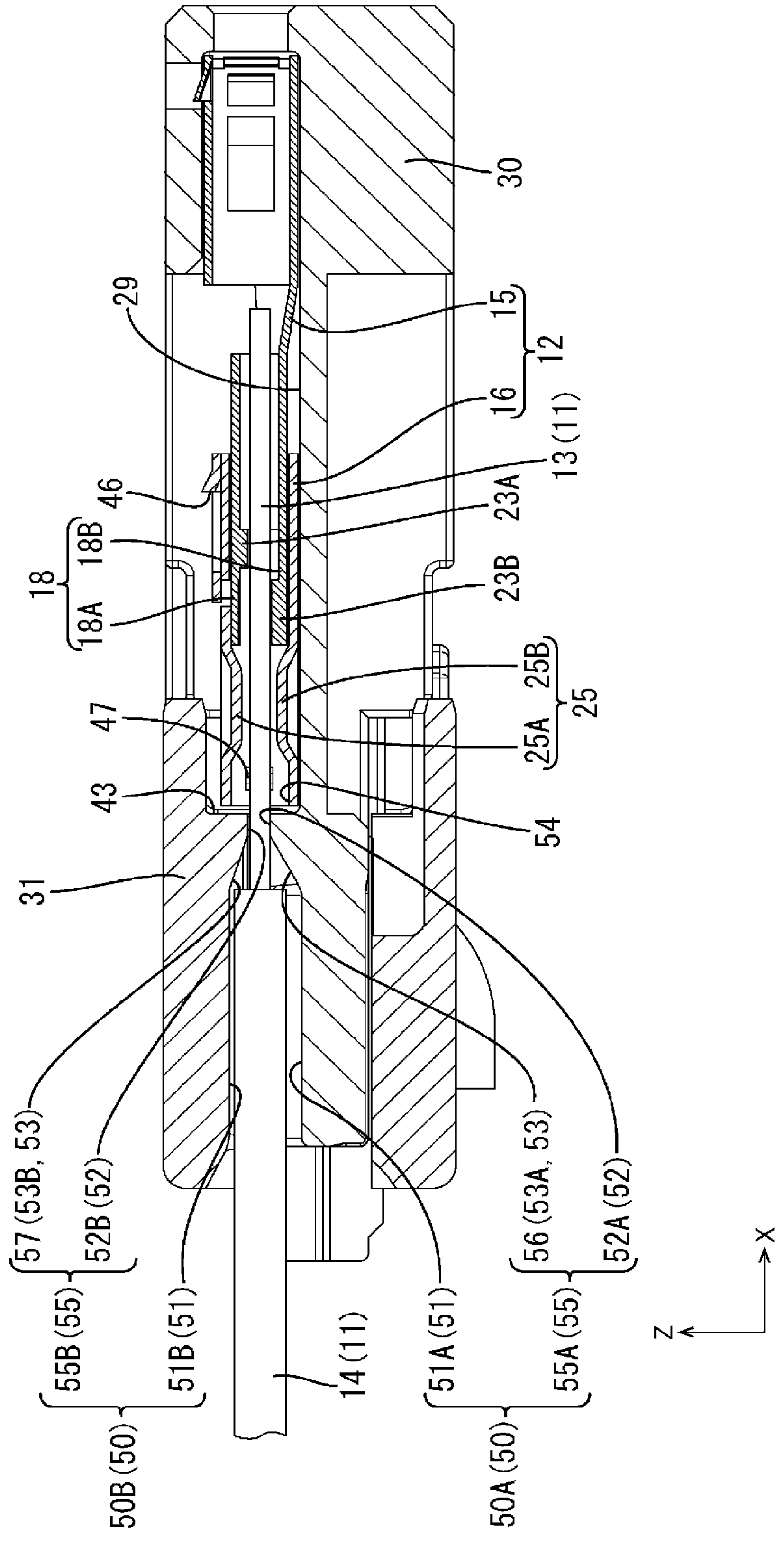
FIG. 14 is a section along A-A of FIG. 10 showing a state where a wire is inserted.

As shown in FIG. 14, the wire 11 is disposed to extend in a front-rear direction. The wire 11 is configured such that the outer peripheral surface of a core wire 13 is surrounded by an insulation coating 14 made of insulating synthetic resin. The core wire 13 is made of electrically conductive metal and constituted by a stranded wire formed by twisting a plurality of metal wires or one metal wire. In a front end part of the wire 11, the insulation coating 14 is removed to expose the core wire 13.

[Terminal]

Figure 2:
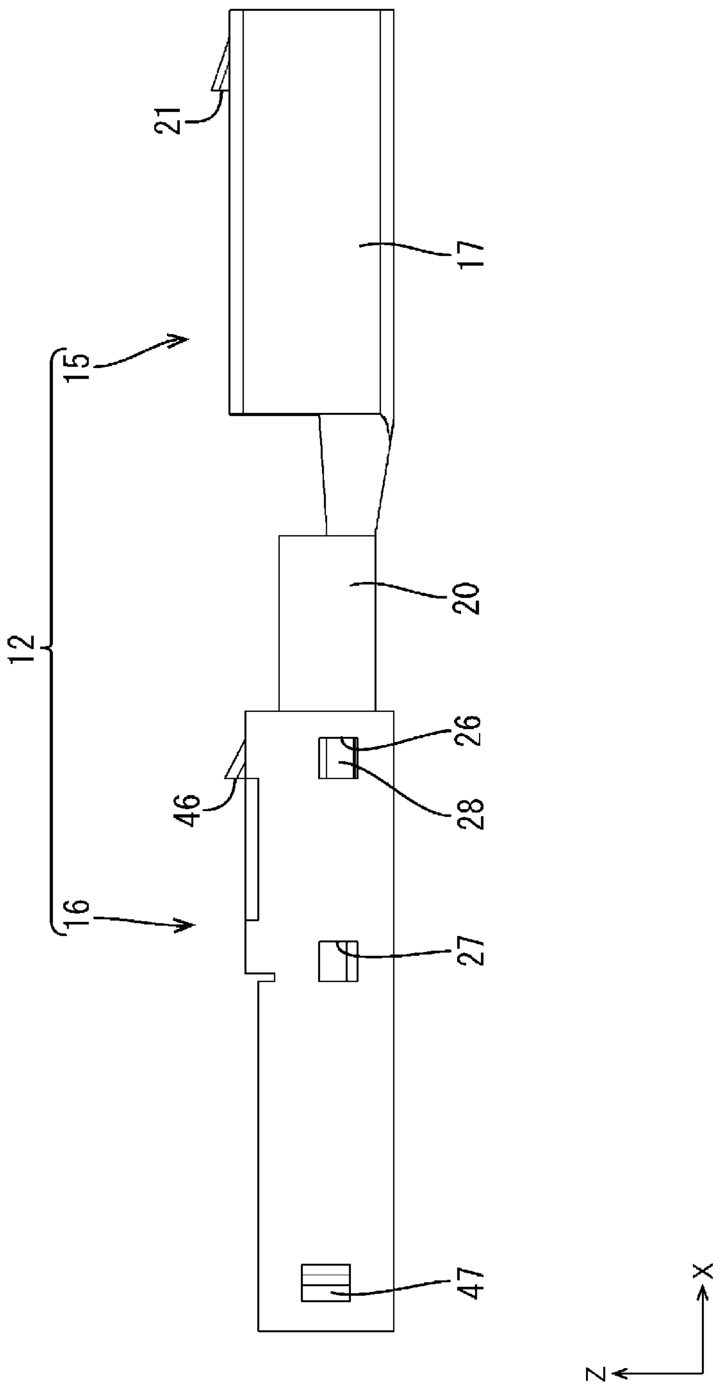
FIG. 2 is a side view of a terminal in which a slide portion is disposed at a separated position.
Figure 4:
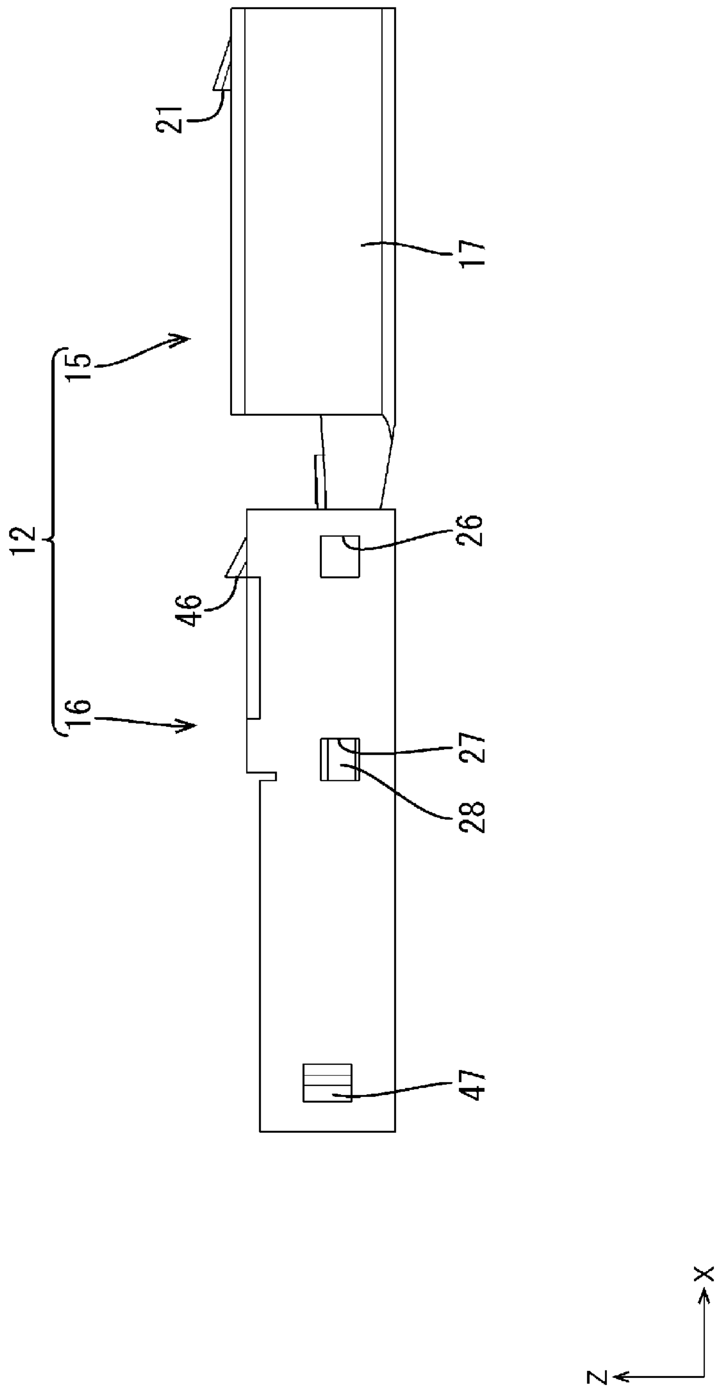
FIG. 4 is a side view of the terminal in which the slide portion is disposed at a pressing position.

The terminal 12 is made of metal and, as shown in FIGS. 2 and 4, provided with a terminal body 15 and a slide portion 16 movable in the front-rear direction with respect to the terminal body 15. The terminal body 15 and the slide portion 16 are formed into predetermined shapes by a known method such as press-working, cutting or casting. An arbitrary metal such as copper, copper alloy, aluminum, aluminum alloy or stainless steel can be appropriately selected as the metal constituting the terminal body 15 and the slide portion 16 if necessary. Plating layers may be formed on the surfaces of the terminal body 15 and the slide portion 16. An arbitrary metal such as tin, nickel or silver can be appropriately selected as a metal constituting the plating layers if necessary.

[Terminal Body]

Figure 5:
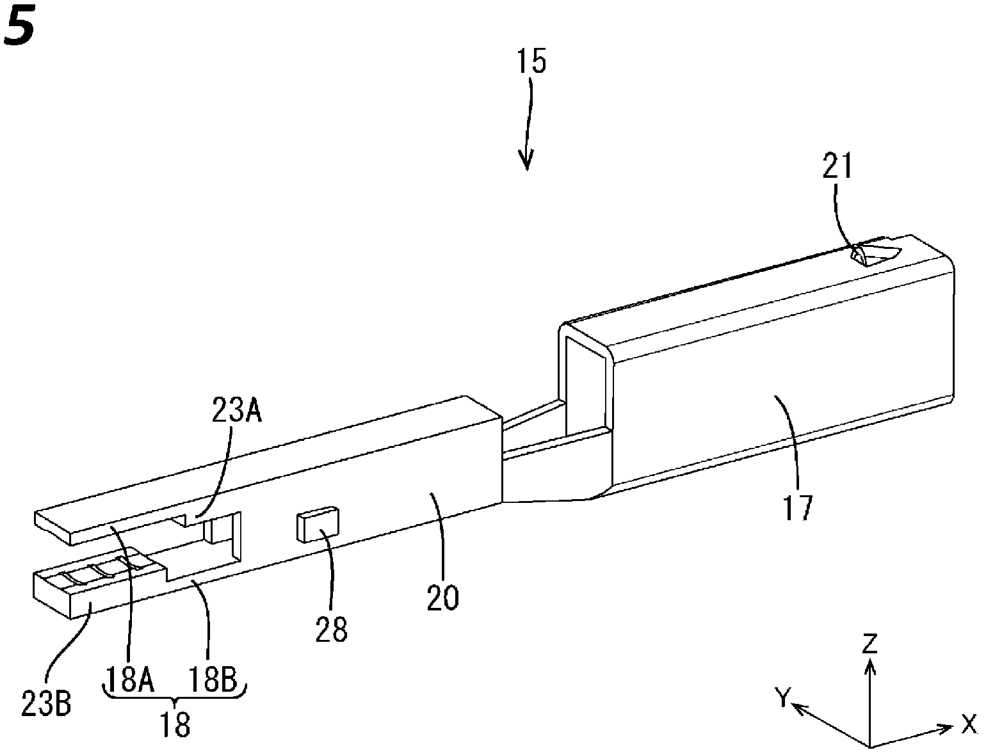
FIG. 5 is a perspective view of a terminal body.

As shown in FIG. 5, a front part of the terminal body 15 serves as a connecting tube portion 17 in the form of a rectangular tube extending in the front-rear direction. A plate-like mating terminal (not shown) can be inserted into the connecting tube portion 17 from front. An unillustrated resilient contact piece is disposed inside the connecting tube portion 17, and a mating terminal inserted into the connecting tube portion 17 contacts the resilient contact piece. A locking lance 21 projecting upward and formed into a chevron shape is formed on a front side of the upper wall of the connecting tube portion 17.

As shown in FIG. 5, a base portion 20 in the form of a rectangular tube is provided behind the connecting tube portion 17. A locking projection 28 projecting outward is formed on a side wall of the base portion 20. An electrically connecting portion 18 is provided on a rear end part of the base portion 20.

[Electrically Connecting Portion]

Figure 16:
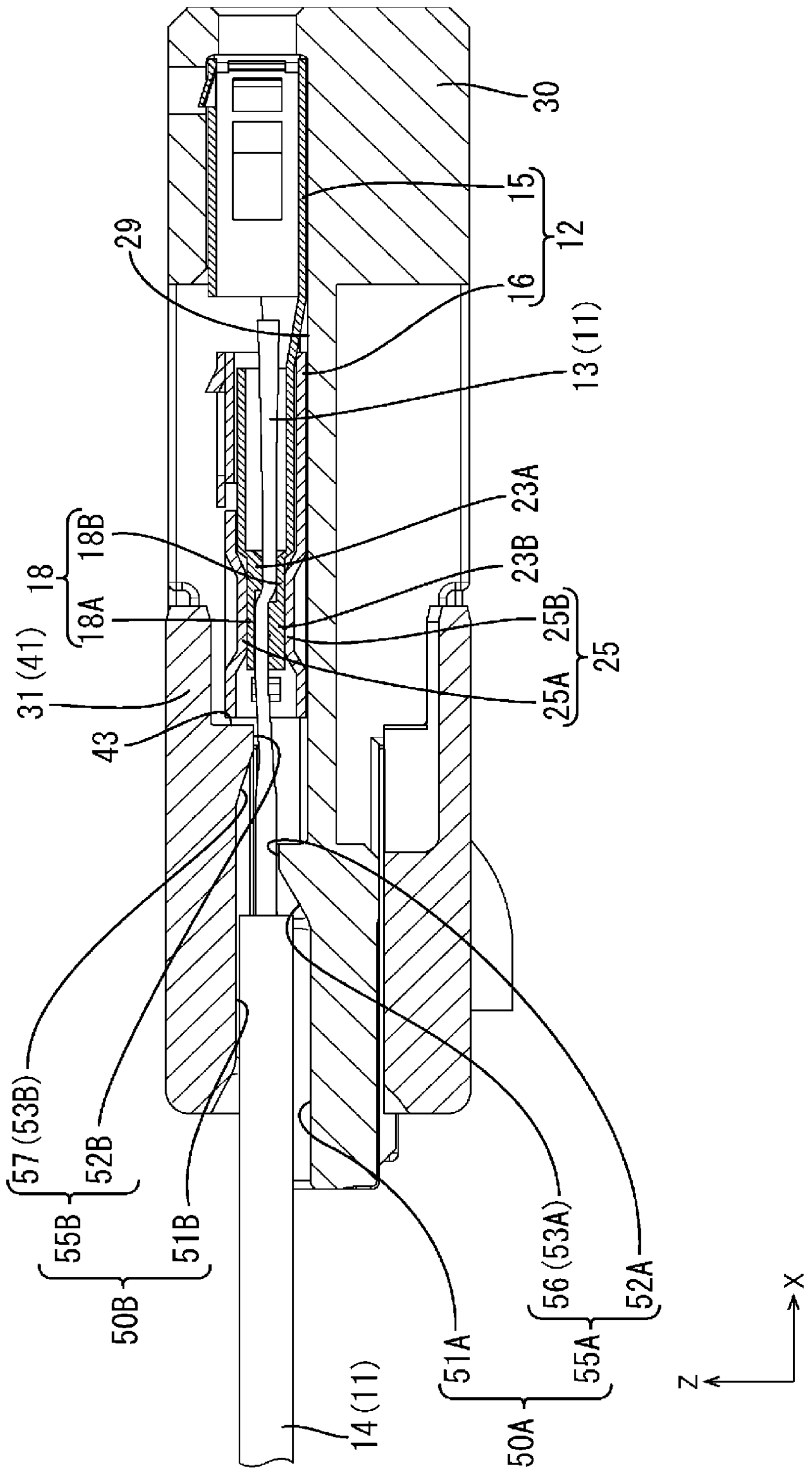
FIG. 16 is a section along A-A of FIG. 10 showing a state where the rear holder is held at a complete locking position on the connector housing.
Figure 17:
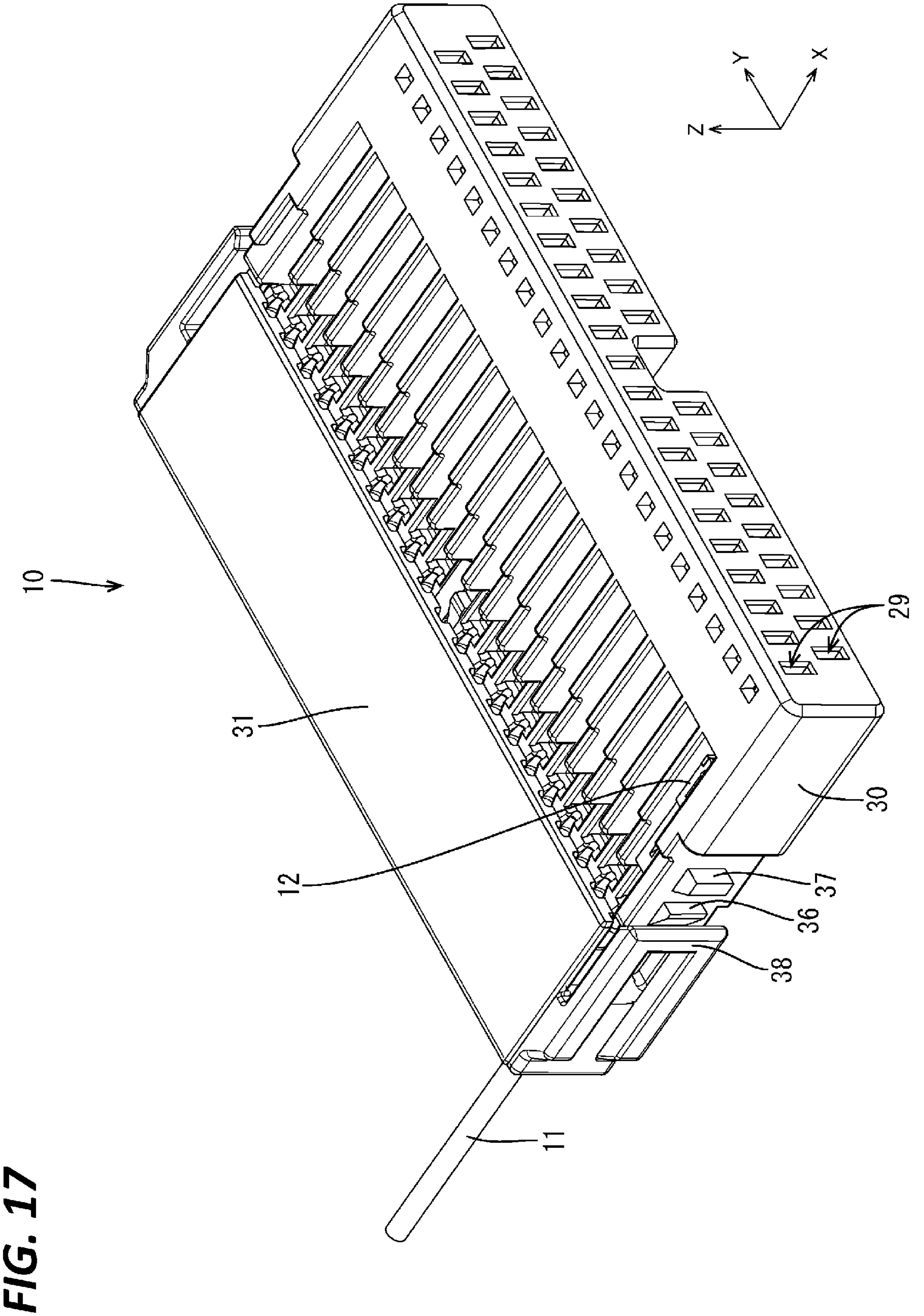
FIG. 17 is a perspective view showing a state where the rear holder is moved rearward from the temporary locking position with respect to the connector housing.

As shown in FIG. 5, the electrically connecting portion 18 is provided with an upper connecting piece 18A extending rearward from a rear end part of the upper wall of the base portion 20 and a lower connecting piece 18B extending rearward from a rear end part of the lower wall of the base portion 20. The upper and lower connecting pieces 18A, 18B have a shape elongated in the front-rear direction and lengths in the front-rear direction thereof are substantially equal. The upper and lower connecting pieces 18A, 18B are formed to be resiliently deformable in a vertical direction with the rear end part of the base portion 20 as a fulcrum. As shown in FIG. 16, the lower surface of the upper connecting piece 18A and the upper surface of the lower connecting piece 18B can sandwich the core wire 13 and electrically connect the wire 11 and the terminal body 15.

As shown in FIG. 5, an upper holding protrusion 23A projecting downward is provided at a position forward of a rear end part on the lower surface of the upper connecting piece 18A. A lower holding protrusion 23B projecting upward is provided on a rear end part of the upper surface of the lower connecting piece 18B. The upper and lower holding protrusions 23A, 23B are provided at positions shifted in the front-rear direction.

[Slide Portion]

Figure 3:
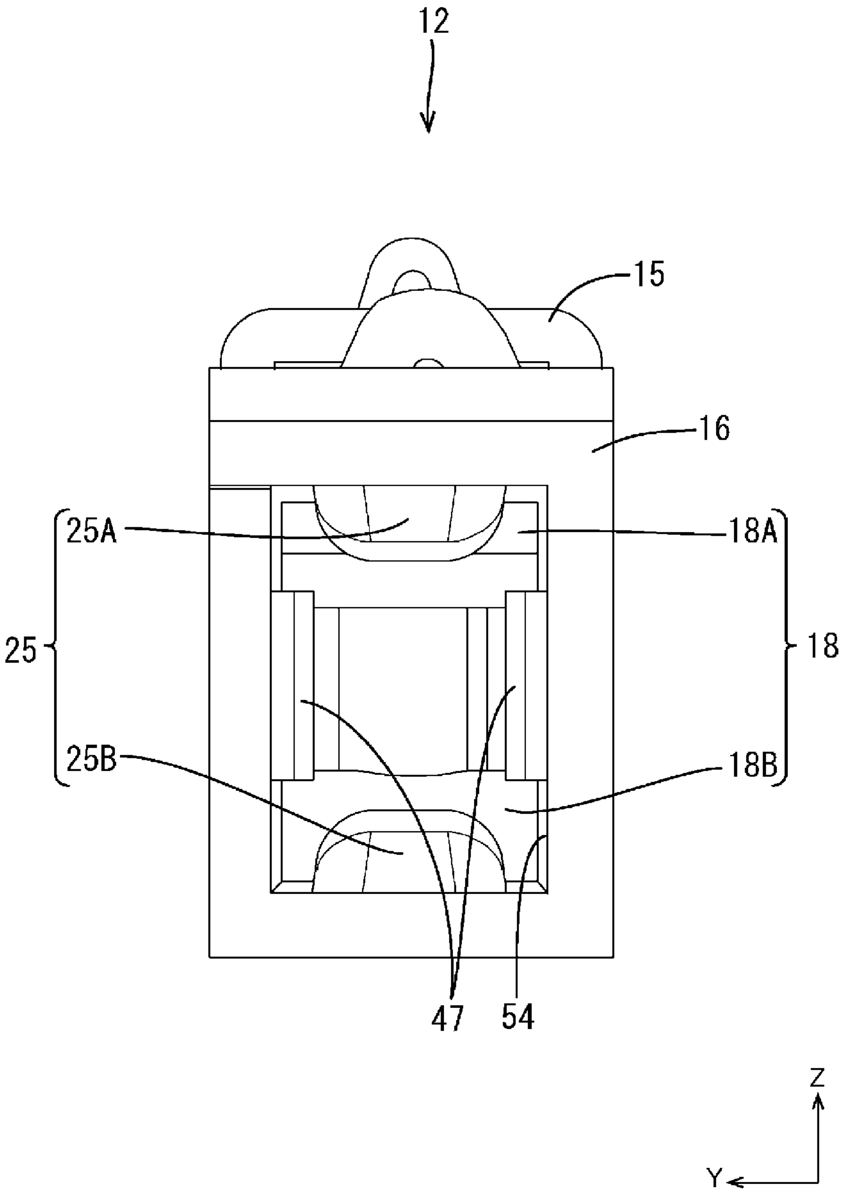
FIG. 3 is a back view of the terminal in which the slide portion is disposed at the separated position.
Figure 6:
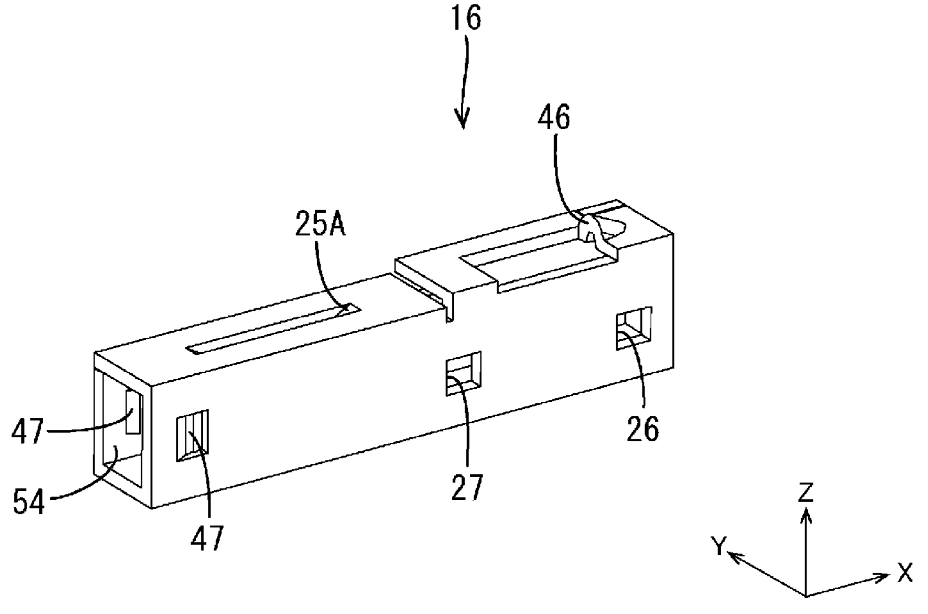
FIG. 6 is a perspective view of the slide portion.

As shown in FIG. 6, the slide portion 16 is in the form of a rectangular tube extending in the front-rear direction. As shown in FIG. 3, an internal cross-sectional shape of the slide portion 16 is the same as or somewhat larger than an external cross-sectional shape of a region of the terminal body 15 where the electrically connecting portion 18 is provided. In this way, the slide portion 16 is externally fittable to the region of the terminal body 15 where the electrically connecting portion 18 is provided.

[Pressing Portion]

Figure 12:
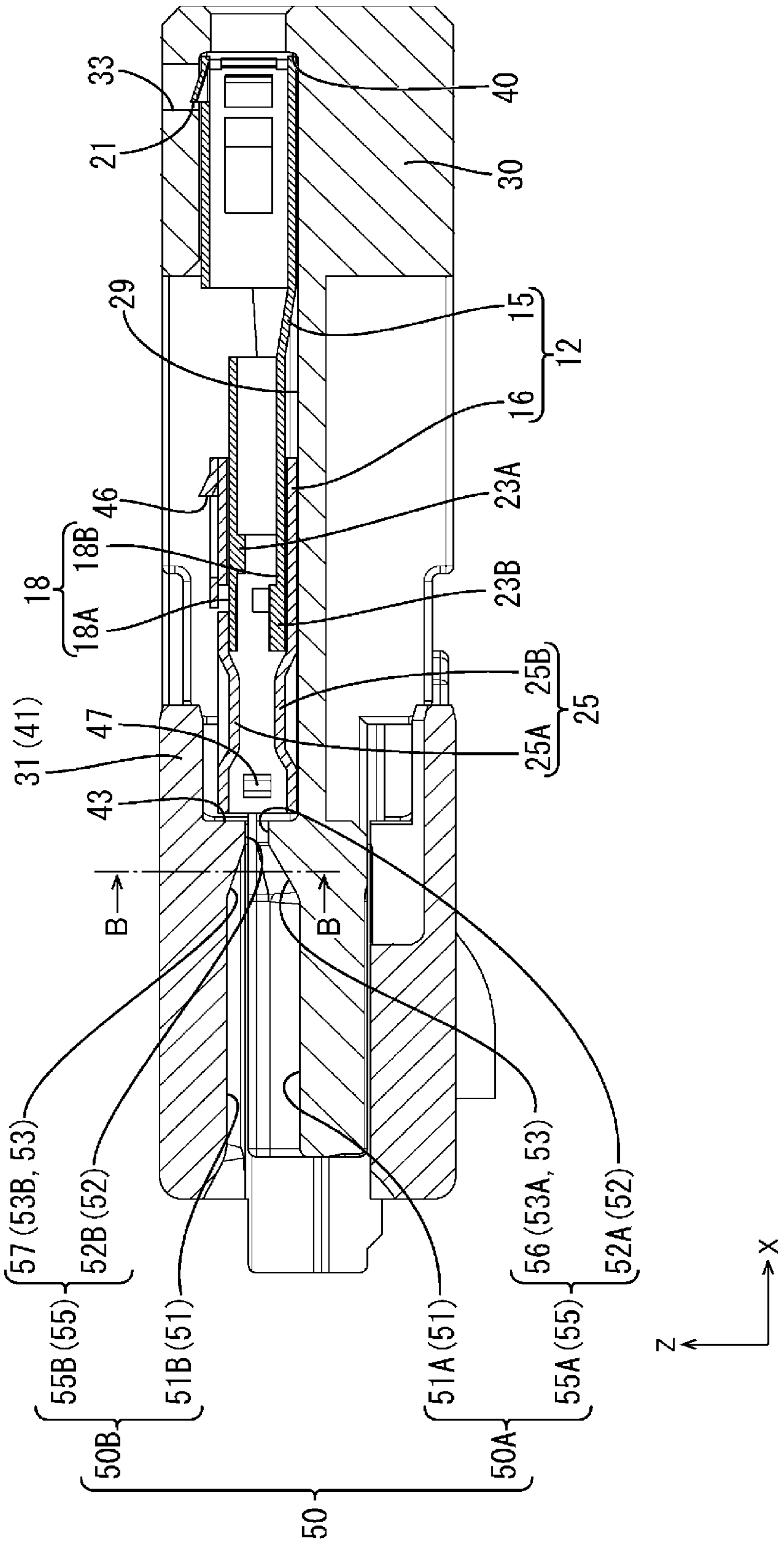
FIG. 12 is a section along A-A of FIG. 10.

As shown in FIGS. 3 and 12, the slide portion 16 is provided with a pressing portion 25. Out of the pressing portion 25, an upper pressing portion 25A projecting downward is arranged on the lower surface of the upper wall of the slide portion 16, and a lower pressing portion 25B projecting upward is arranged on the upper surface of the lower wall of the slide portion 16.

As shown in FIGS. 2 and 4, a temporary lock receiving portion 26 is open at a position near a front end part in a side wall of the slide portion 16. Further, a complete lock receiving portion 27 is open at a position behind the temporary lock receiving portion 26 in the side wall of the slide portion 16. The temporary lock receiving portion 26 and the complete lock receiving portion 27 are resiliently lockable to the locking projection 28 of the terminal body 15.

[Separated Position]

As shown in FIG. 2, a state where the locking projection 28 of the terminal body 15 and the temporary lock receiving portion 26 of the slide portion 16 are locked is a state where the slide portion 16 is held at a separated position with respect to the terminal body 15. In this state, the pressing portion 25 of the slide portion 16 is disposed behind the rear end edge of the electrically connecting portion 18 of the terminal body 15 as shown in FIG. 12. Further, in this state, an interval between the upper and lower connecting pieces 18A, 18B is set to be larger than a diameter of the core wire 13.

[Pressing Position]

As shown in FIG. 4, a state where the locking projection 28 of the terminal body 15 and the complete lock receiving portion 27 of the slide portion 16 are locked is a state where the slide portion 16 is held at a pressing position with respect to the terminal body 15. In this state, as shown in FIG. 16, the upper pressing portion 25A of the slide portion 16 is in contact with the upper surface of the upper connecting piece 18A of the terminal body 15 from above. Further, the lower pressing portion 25B of the slide portion 16 is in contact with the lower surface of the lower connecting piece 18B of the terminal body 15 from below.

As shown in FIG. 16, with the slide portion 16 held at the pressing position with respect to the terminal body 15, the upper pressing portion 25A presses the upper connecting piece 18A from above, whereby the upper connecting piece 18A is resiliently deformed downward. Further, the lower pressing portion 25B presses the lower connecting piece 18B from below, whereby the lower connecting piece 18B is resiliently deformed upward. In this way, the core wire 13 is disposed to extend in the front-rear direction in a space between the upper and lower connecting pieces 18A, 18B and, with the slide portion 16 held at the pressing position with respect to the terminal body 15, the core wire 13 is sandwiched in the vertical direction by the resiliently deformed upper and lower connecting pieces 18A, 18B.

As shown in FIG. 16, with the slide portion 16 held at the pressing position with respect to the terminal body 15, the upper holding protrusion 23A of the upper connecting piece 18A presses the core wire 13 from above and the lower holding protrusion 23B of the lower connecting piece 18B presses the core wire 13 from below. In this way, the core wire 13 is pressed from above by the upper holding protrusion 23A and pressed from below by the lower holding protrusion 23B, thereby being held in a state bent in the vertical direction. In this way, a holding force of the core wire 13 in the terminal body 15 can be improved.

[Jig Contact Portion]

Figure 15:
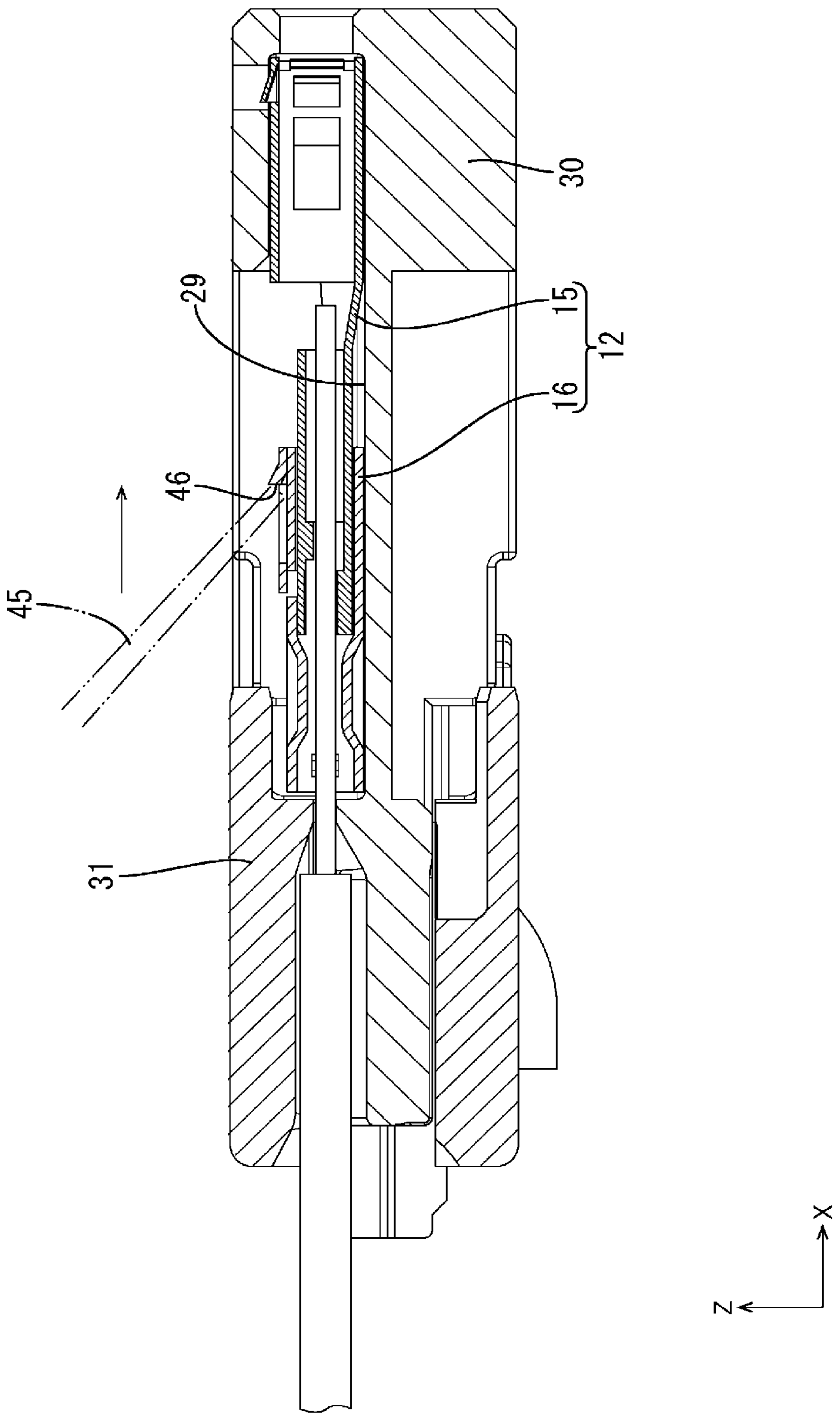
FIG. 15 is a section along A-A of FIG. 10 showing a step of moving the slide portion from the separated position to the pressing position.

As shown in FIG. 6, a jig contact portion 46 projecting upward from the upper wall as shown in FIGS. 4 and 5 is provided on a front end part of the slide portion 16. As shown in FIG. 15, a jig 45 comes into contact with the jig contact portion 46 from behind and pushes the slide portion 16 forward, whereby the slide portion 16 is movable forward.

[Core Wire Insertion Opening, Guiding Portion]

As shown in FIGS. 3 and 6, a rear end part of the rectangular tubular slide portion 16 serves as a core wire insertion opening 54, through which the core wire 13 is inserted into the slide portion 16. A pair of guiding portions 47 projecting inwardly of the slide portion 16 are provided at positions near the rear end part of the slide portion 16 on both left and right side walls. The guiding portion 47 is formed to be narrower from rear toward front. The core wire 13 is inserted through the core wire insertion opening 54 and slides in contact with the inner surfaces of the guiding portions 47, thereby being guided into the slide portion 16 (see FIG. 14).

[Connector Housing, Terminal Accommodating Portions]

Figure 7:
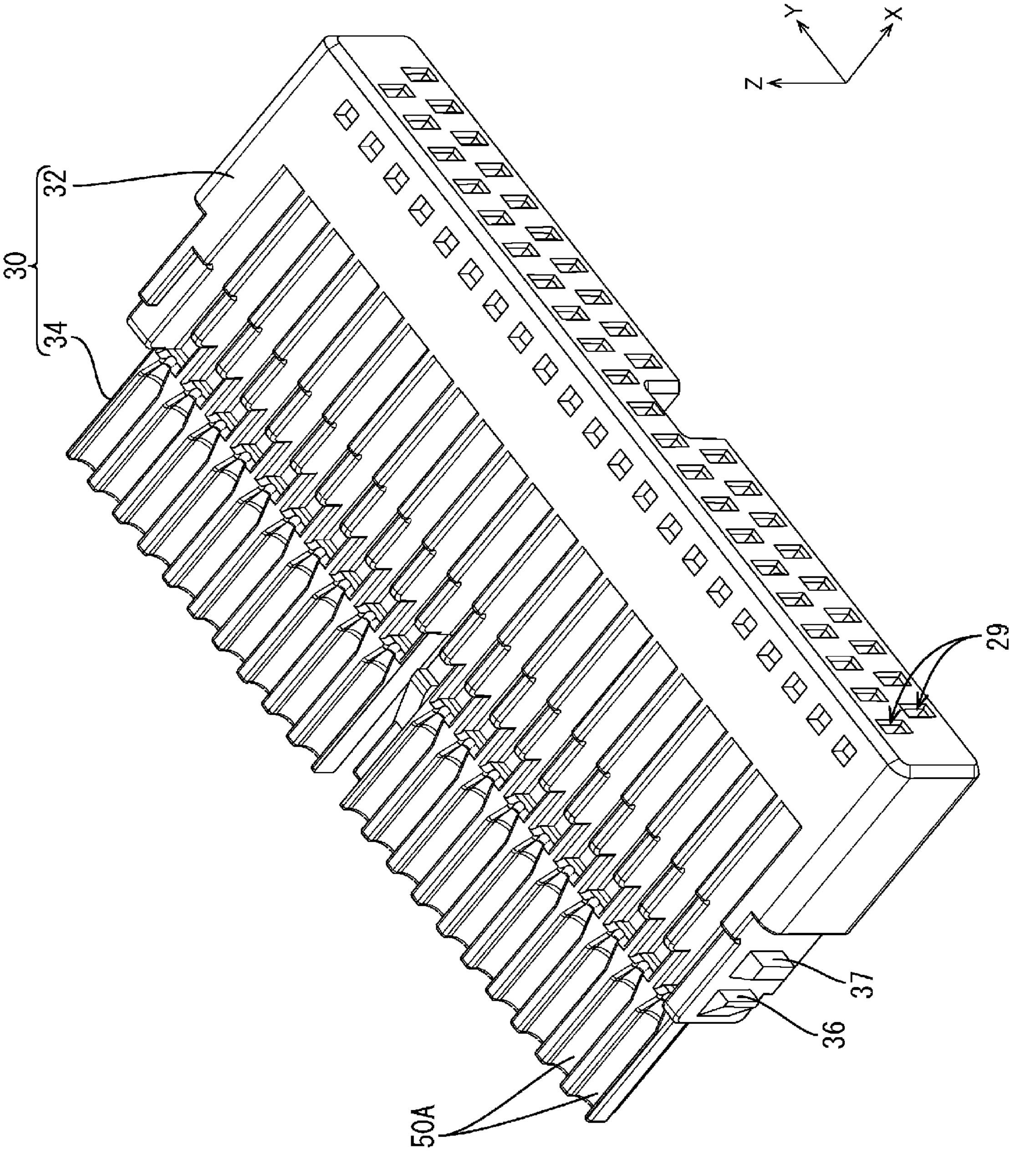
FIG. 7 is a perspective view of a connector housing.
Figure 8:
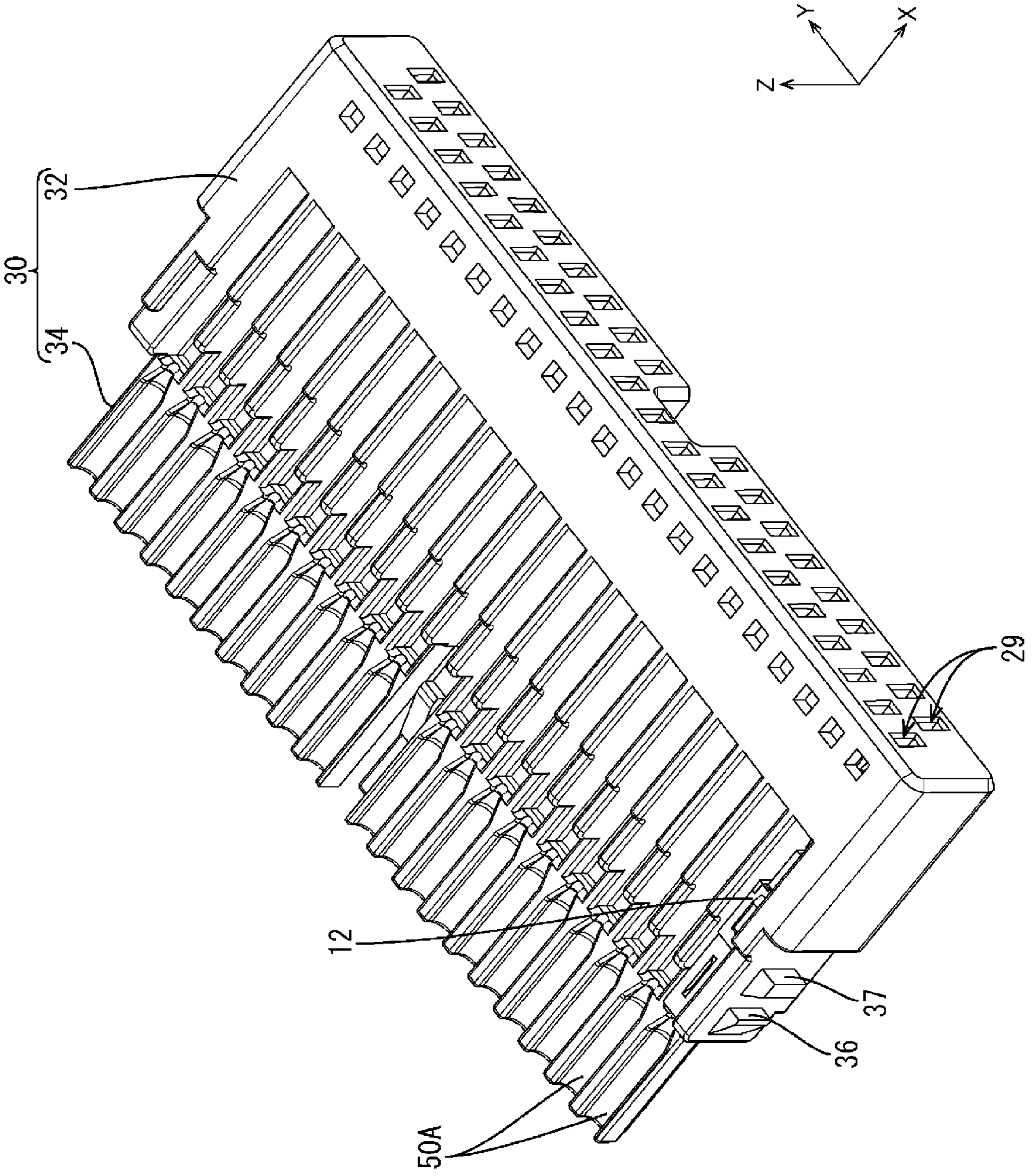
FIG. 8 is a perspective view showing a state where the terminal is accommodated in the connector housing.

The connector housing 30 is made of insulating synthetic resin and, as shown in FIGS. 7 and 8, provided with a body portion 32 having a substantially rectangular parallelepiped shape and a separation wall 34 extending rearward from the rear end of the body portion 32. The body portion 32 is provided with a plurality of terminal accommodating portions 29 for accommodating the terminals 12. The terminal accommodating portions 29 extend in the front-rear direction and are disposed at intervals in a lateral direction. Further, the terminal accommodating portions 29 are arranged in two stages in the vertical direction, and the terminal accommodating portions 29 in the upper stage are disposed at positions shifted in the lateral direction from the terminal accommodating portions 29 in the lower stage. Note that the number of the terminal accommodating portions 29 is arbitrary and the number of the stages in the vertical direction is also arbitrary. The front ends of the terminal accommodating portions 29 are open forward, so that mating terminals are insertable.

As shown in FIG. 12, the connector housing 30 is provided with locking walls 33 to correspond to the positions of the locking lances 21 of the terminals 12 with the terminals 12 accommodated in the terminal accommodating portions 29. The terminals 21 are prevented from coming out rearward by locking the locking lances 21 by the locking walls 33.

As shown in FIG. 12, front stop portions 40 configured to come into contact with front end parts of the terminals 12 are formed in a front end part of the connector housing 30. The front stop portion 40 comes into contact with the terminal 12 to prevent the terminal 12 from coming out forward from the connector housing 30 when the terminal 12 is inserted into the terminal accommodating portion 29.

As shown in FIG. 7, a temporary locking portion 36 and a complete locking portion 37 are provided to project outward on each of both left and right side walls of the body portion 32 of the connector housing 30. The temporary locking portion 36 is disposed at a position near a rear end part of the body portion 32, and the complete locking portion 37 is disposed forward of the temporary locking portion 36.

[Rear Holder]

Figure 9:
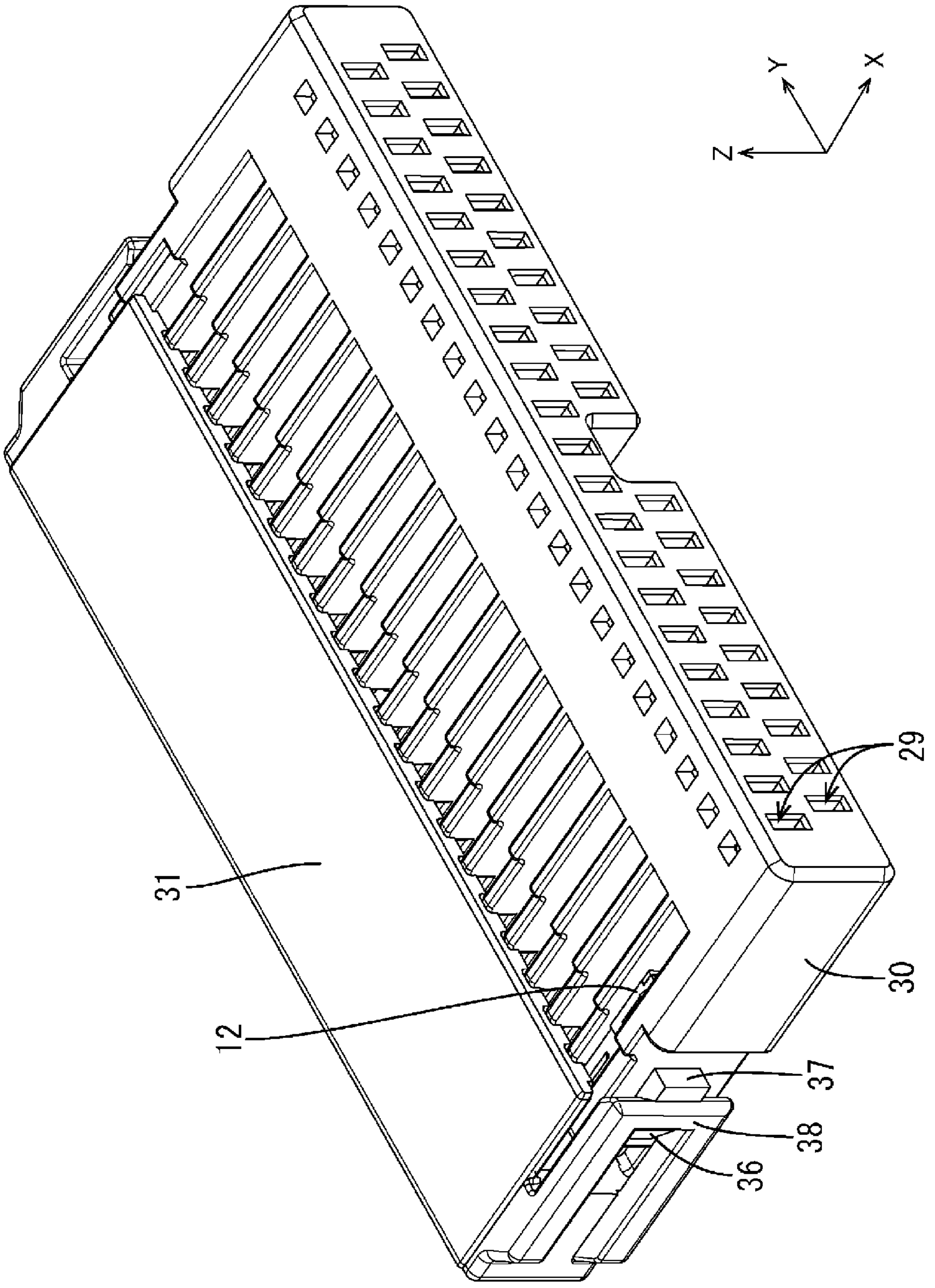
FIG. 9 is a perspective view showing a state where a rear holder is held at a temporary locking position on the connector housing.
Figure 10:
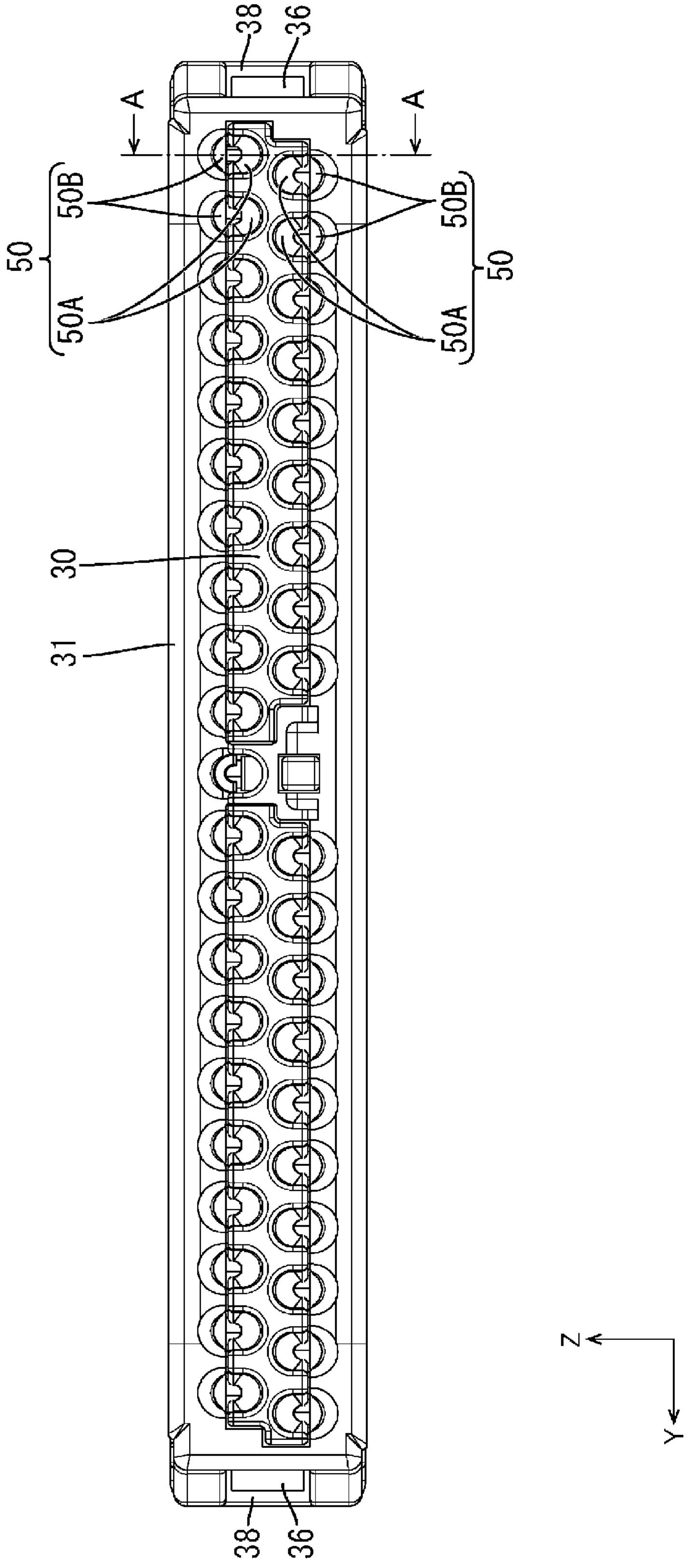
FIG. 10 is a back view showing the state where the rear holder is held at the temporary locking position on the connector housing.

The rear holder 31 is made of insulating synthetic resin and, as shown in FIGS. 1, 9 and 10, in the form of a box open in the front-rear direction. The rear holder 31 is externally fit to a rear half of the connector housing 30. Lock receiving portions 38 are provided at positions near front end parts of both left and right side walls of the rear holder 31. The lock receiving portion 38 is substantially gate-shaped. The lock receiving portion 38 is locked to the temporary locking portion 36 and the complete locking portion 37 of the connector housing 30.

[Temporary Locking Position, Complete Locking Position]

As shown in FIG. 9, the rear holder 31 is held at a temporary locking position with respect to the connector housing 30 by locking the temporary locking portions 36 of the connector housing 30 and the lock receiving portions 38 of the rear holder 31. Further, as shown in FIG. 1, the rear holder 31 is held at a complete locking position with respect to the connector housing 30 by locking the complete locking portions 37 of the connector housing 30 and the lock receiving portions 38 of the rear holder 31.

[Locking Surfaces]

As shown in FIG. 12, the rear holder 31 is provided with a receptacle 41 which is open forward and into which the connector housing 30 is fit. A front end part of the receptacle 41 covers the terminals 12 disposed in the connector housing 30 from outside. As shown in FIG. 16, locking surfaces 43 to be locked to the rear end parts of the terminals 12 are provided on a front side of the receptacle 41.

[Wire Inserting Portions, Guide Portions]

As shown in FIG. 14, wire inserting portions 50, into which the wires 11 are inserted, are formed behind the terminal accommodating portions 29. The wire inserting portion 50 includes a large-diameter portion 51 having a large opening diameter, a small-diameter portion 52 having a smaller opening diameter than the large-diameter portion 51 and a reduced diameter portion 53 continuously connecting the large-diameter portion 51 and the small-diameter portion 52. The small-diameter portion 52 is disposed in a front end part of the wire inserting portion 50. The reduced-diameter portion 53 is disposed at a position near a front end part of the wire inserting portion 50 and formed to gradually reduce an opening diameter toward a front side. The large-diameter portion 51 is provided in a part from the rear end of the reduced-diameter portion 53 to the rear end of the wire inserting portion 50. The insulation coating 14 of the wire 11 can be accommodated inside the large-diameter portion 51. The core wire 13 of the wire 11 can be accommodated inside the small-diameter portion 52. A guide portion 55 for guiding the insertion of the core wire 13 into the core wire insertion opening 54 of the terminal 12 is composed of the reduced-diameter portion 53 and the small-diameter portion 52.

As shown in FIG. 10, the wire inserting portion 50 is composed of a first wire inserting portion 50A provided on the side of the connector housing 30 and a second wire inserting portion 50B provided on the side of the rear holder 31. Since the rear holder 31 is disposed to cover the outside of the connector housing 30, the second wire inserting portion 50B is disposed on an upper side and the first wire inserting portion 50A is disposed on a lower side in the upper stage, and the first wire inserting portion 50A is disposed on an upper side and the second wire inserting portion 50B is disposed on a lower in the lower stage. The configuration of the wire inserting portion 50 is described based on a positional relationship in the upper stage below unless otherwise stated.

Figure 18:
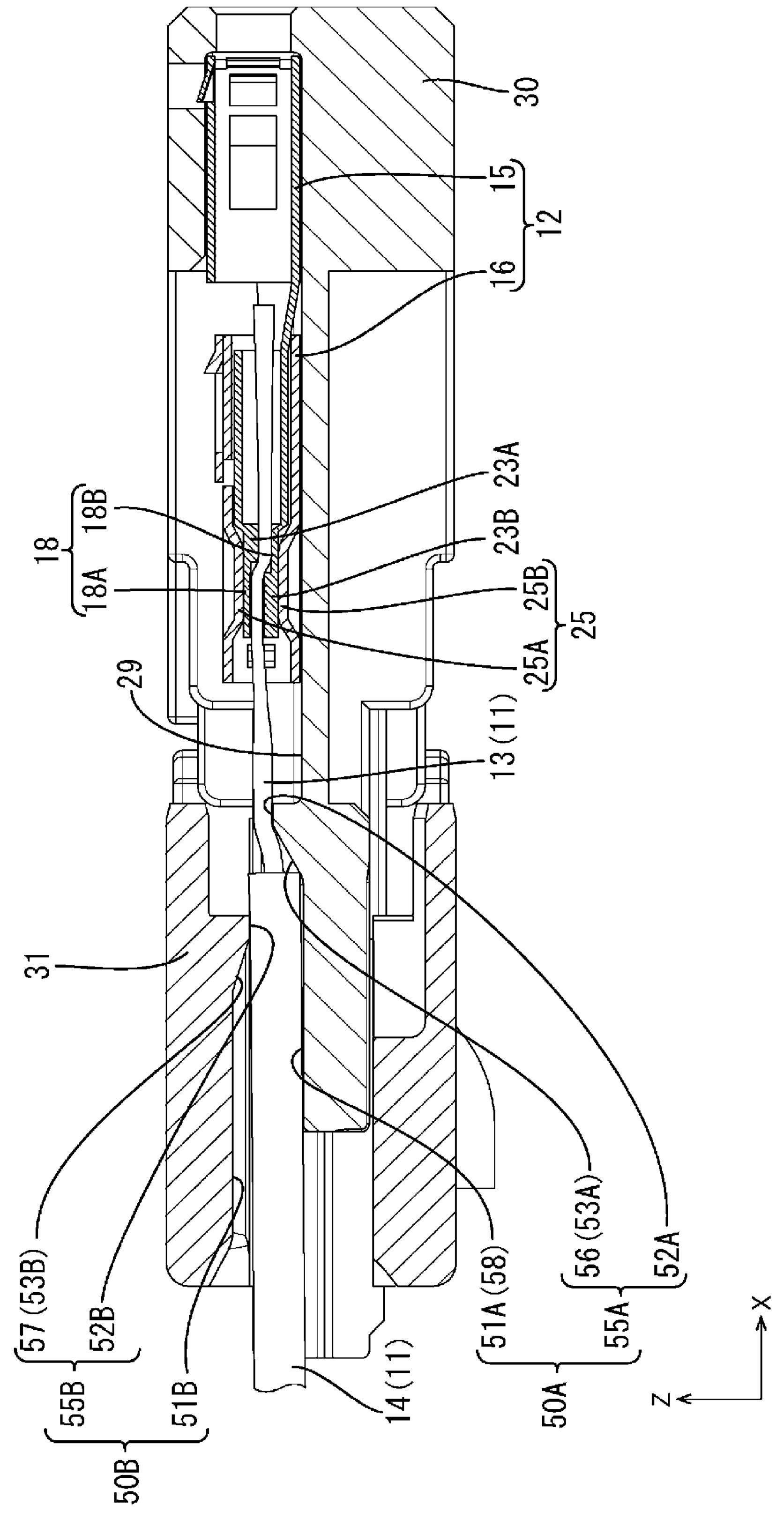
FIG. 18 is a section along A-A of FIG. 10 showing the state where the rear holder is moved rearward from the temporary locking position with respect to the connector housing.

Since the rear holder 31 is movable in the front-rear direction with respect to the connector housing 30 in this embodiment, it should be noted that the first and second wire inserting portions 50A, 50B can be relatively shifted in the front-rear direction as shown in FIGS. 16 and 18. Particularly, the guide portion 55 of the wire inserting portion 50 exhibits a guide function of guiding the core wire 13 of the wire 11 into the core wire insertion opening 54 of the terminal 12 only in a state where the rear holder 31 is held at the temporary locking position and the slide portion 16 is disposed at the separated position as shown in FIG. 14. On the other hand, if the rear holder 31 is not held at the temporary locking position, the guide portion 55 is not configured (see FIGS. 16 and 18).

As shown in FIG. 7, a plurality of the first wire inserting portions 50A are provided above and below the separation wall 34. The first wire inserting portions 50A are in the form of grooves extending in the front-rear direction and disposed side by side at equal intervals in the lateral direction. Each first wire inserting portion 50A is formed to be continuous with each terminal accommodating portion 29.

As shown in FIG. 12, the first wire inserting portion 50A includes a first large-diameter portion 51A disposed on a rear side, a first small-diameter portion 52A disposed in a front end part and a first reduced-diameter portion 53A coupling the first large-diameter portion 51A and the first small-diameter portion 52A. Each of the first large-diameter portion 51A and the first small-diameter portion 52A has a substantially U-shaped constant cross-sectional shape.

[Conical Portion, First Inner Wall]

Figure 13:
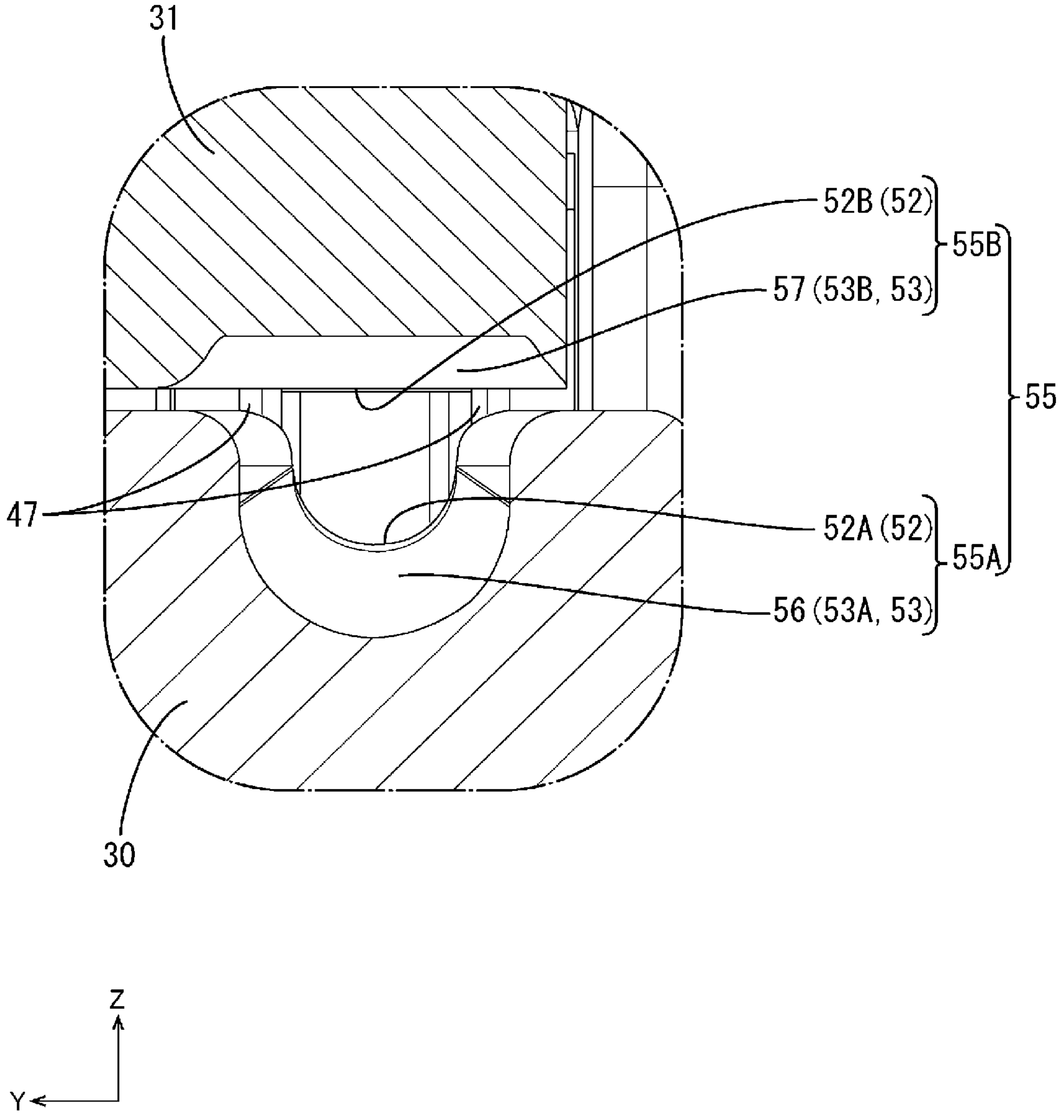
FIG. 13 is a section along B-B of FIG. 12.

As shown in FIG. 13, the first reduced-diameter portion 53A has a substantially U-shaped cross-sectional shape. As shown in FIG. 12, the first reduced-diameter portion 53A is formed to reduce dimensions in the lateral direction and vertical direction toward a front side. That is, the first reduced-diameter portion 53A serves as a conical portion 56 disposed to approach the first small-diameter portion 52A toward the front side. A first inner wall 55A of the connector housing 30 is constituted by the first small-diameter portion 52A and the first reduced-diameter portion 53A (conical portion 56).

As shown in FIG. 12, the rear holder 31 is provided with second wire inserting portions 50B at positions facing the first wire inserting portions 50A in the vertical direction with the rear holder 31 held at the temporary locking position. The second wire inserting portion 50B includes a second large-diameter portion 51B disposed on a rear side, a second small-diameter portion 52B disposed in a front end part and a second reduced-diameter portion 53B coupling the second large-diameter portion 51B and the second small-diameter portion 52B. The second large-diameter portion 51B has a substantially U-shaped constant cross-sectional shape and extends in the front-rear direction. The second small-diameter portion 52B is a flat surface orthogonal to an axis extending in the vertical direction. The second small-diameter portion 52B is disposed to connect the second reduced-diameter portion 53B and the locking surface 43.

[Inclined Surface, Second Inner Wall]

As shown in FIG. 12, the second reduced-diameter portion 53B is in the form of a flat surface intersecting an axis extending in the front-rear direction and serves as an inclined surface 57 located downward (upward in the lower stage) toward the front side. Therefore, as shown in FIG. 13, the first reduced-diameter portion 53A (conical portion 56) has a U-shaped cross-sectional shape, whereas the second reduced-diameter portion 53B (inclined surface 57) has a linear cross-sectional shape. As shown in FIG. 12, a second inner wall 55B of the rear holder 31 is constituted by the second small-diameter portion 52B and the second reduced-diameter portion 53B (inclined surface 57).

Figure 11:
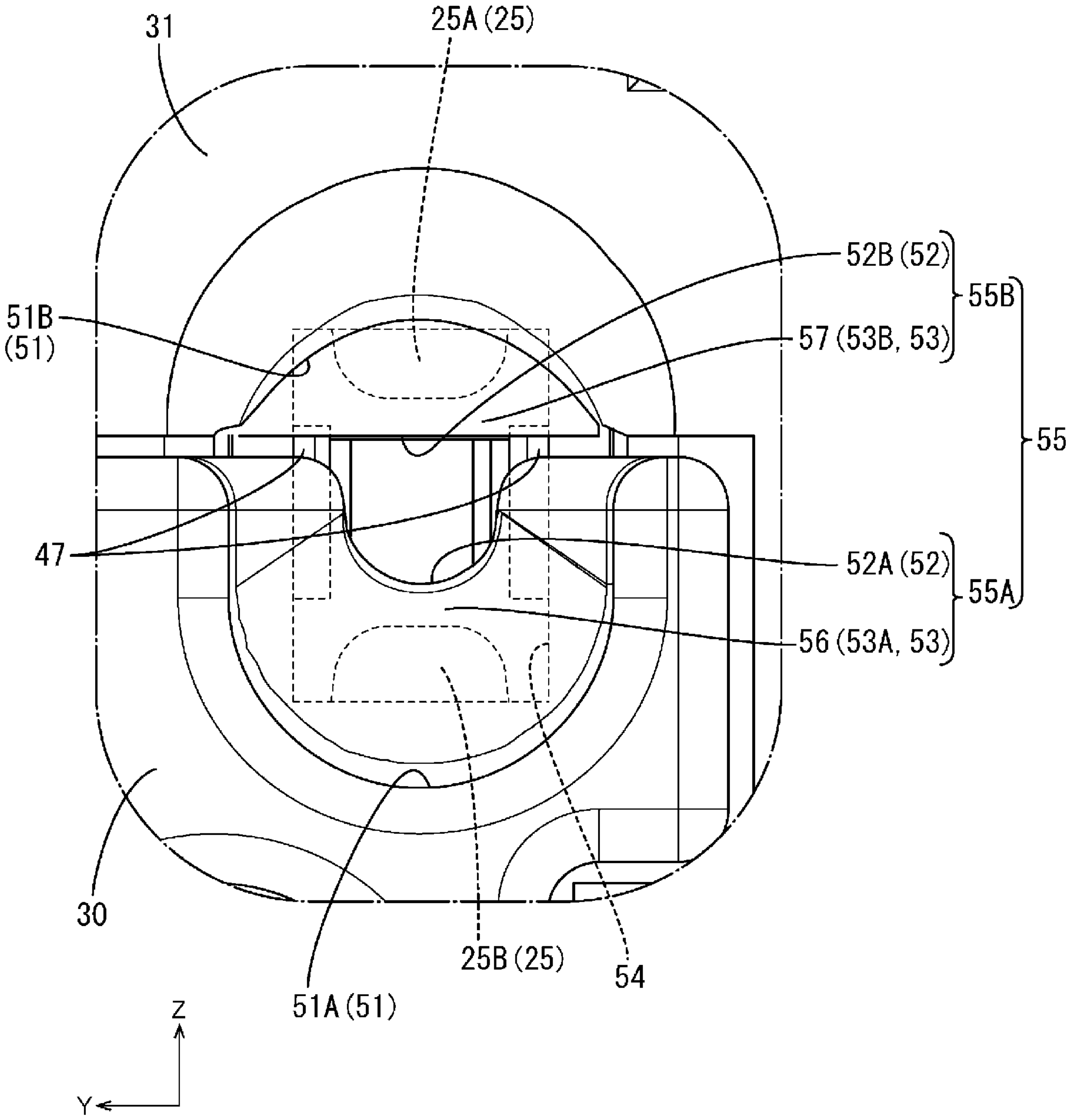
FIG. 11 is an enlarged view of FIG. 10.

As shown in FIG. 12, the first and second inner walls 55A, 55B constitute the guide portion 55 with the rear holder 31 held at the temporary locking position. The guide portion 55 includes the reduced-diameter portion 53 narrowed toward the front side and the small-diameter portion 52. As shown in FIG. 11, a minimum opening diameter of the guide portion 55 is smaller than an opening diameter of the core wire insertion opening 54 and the guide portion 55 is disposed to conceal most of the core wire insertion opening 54 when viewed from behind. Further, as shown in FIG. 14, the minimum opening diameter of the guide portion 55 is larger than the diameter of the core wire 13. Thus, the guide portion 55 can guide the core wire 13 into the core wire insertion opening 54 by sliding in contact with the core wire 13.

More particularly, the conical portion 56 (first reduced-diameter portion 53A) in the form of a curved surface slides in contact with the core wire 13 to guide the core wire 13 into the first small-diameter portion 52A (see FIG. 11). In FIG. 11, since the second reduced-diameter portion 53B is the inclined surface 57 disposed downward toward the front side (back side in a direction perpendicular to the plane of FIG. 11), the second reduced-diameter portion 53B slides in contact with the core wire 13 to guide the core wire 13 downward. Here, the second reduced-diameter portion 53B guides the core wire 13 only downward and cannot guide the core wire 13 in the lateral direction. However, since most (about ¾) of the reduced-diameter portion 53 serves as the conical portion 56 (first reduced-diameter portion 53A) when viewed from behind, the guide function of guiding the core wire 13 into the core wire insertion opening 54 is sufficiently exhibited in the guide portion 55 as a whole. Further, since the slide portion 16 is provided with the guiding portions 47, the core wire 13 is guided into the terminal 12 also by the guiding portions 47.

As shown in FIG. 16, in a state where the slide portions 16 are disposed at the pressing position, the terminals 12 are connected to the wires 11 and the rear holder 31 is held at the complete locking position, the second reduced-diameter portions 53B are disposed side by side in the front-rear direction with the locking surfaces 43 locked to the rear end parts of the terminals 12. Thus, for example, if the wire 11 is pulled rearward, a part of the rear holder 31 from the locking surface 43 to the second reduced-diameter portion 53B receives a shear stress by the rear end part of the terminal 12. In this embodiment, since the second reduced-diameter portion 53B is the flat inclined surface 57, a shear cross-sectional area is easily increased as compared to the case where the second reduced-diameter portion 53B is a curved surface like the first reduced-diameter portion 53A.

[Wire Receiving Space]

As shown in FIG. 11, a dimension in the vertical direction of the large-diameter portion 51 is larger than a dimension in the lateral direction thereof. Particularly, the dimension in the vertical direction of the first large-diameter portion 51A on the side of the connector housing 30 is set to be equal to or somewhat larger than the outer diameter of the wire 11 (part including the insulation coating 14). Thus, as shown in FIG. 18, the connector housing 30 has wire receiving spaces 58 enabling the wires 11 to be received into the first large-diameter portions 51A. By disposing the wires 11 in the wire receiving spaces 58, the second inner walls 55B do not interfere with the insulation coatings 14 of the wires 11 even if the rear holder 31 is removed from the connector housing 30.

[Manufacturing Method of Connector 10]

An example of a manufacturing method of the connector 10 according to this embodiment is described below.

By a known method, the terminal body 15 and the slide portion 16 are formed. The slide portion 16 is assembled with the terminal body 15 from behind. The front end edge of the slide portion 16 comes into contact with the locking projection 28 of the terminal body 15 from behind, and the side wall of the slide portion 16 is expanded and deformed. If the slide portion 16 is further pushed forward, the side wall of the slide portion 16 is restored and the temporary lock receiving portion 26 of the slide portion 16 is locked to the locking projection 28 of the terminal body 15. In this way, the slide portion 16 is held at the separated position with respect to the terminal body 15. In this way, the terminal 12 is obtained (see FIG. 2).

The connector housing 30 and the rear holder 31 are formed by injection-molding a synthetic resin. After the terminals 12 are inserted into the terminal accommodating portions 29 of the connector housing 30 from behind (see FIG. 8), the rear holder 31 is assembled with the rear end part of the connector housing 30 from behind. Then, the lock receiving portions 38 of the rear holder 31 ride on the temporary locking portions 36 of the connector housing 30 while being resiliently deformed. If the rear holder 31 is pushed further forward, the lock receiving portions 38 are restored and the lock receiving portions 38 are resiliently locked to the temporary locking portions 36 of the connector housing 30. In this way, the rear holder 31 is held at the temporary locking position with respect to the connector housing 30 (see FIGS. 9 and 12).

The core wire 13 of a predetermined length is exposed in the end part of the wire 11. A front end part of the core wire 13 is inserted into the wire inserting portion 50 from behind. The wire 11 is first disposed in the large-diameter portion 51 of the wire inserting portion 50. If the wire 11 is pushed further forward, the front end part of the core wire 13 reaches the reduced-diameter portion 53. The front end part of the core wire 13 slides in contact with the reduced-diameter portion 53, thereby being guided into the small-diameter portion 52. If the wire 11 is pushed further forward, the front end part of the core wire 13 is inserted into the core wire insertion opening 54 of the slide portion 16 from the front end of the small-diameter portion 52. That is, the core wire 13 is guided into the core wire insertion opening 54 by the guide portion 55 (reduced-diameter portion 53 and small-diameter portion 52). The core wire 13 is guided into the slide portion 16 also by coming into contact with the guiding portions 47 of the slide portion 16.

If the wire 11 is pushed further forward, the core wire 13 enters the inside of the terminal body 15 and is disposed at the position of the electrically connecting portion 18 in the front-rear direction as shown in FIG. 14. That is, the core wire 13 passes through the space between the upper and lower connecting pieces 18A, 18B. In this state, the insulation coating 14 of the wire 11 is located inside the large-diameter portion 51 of the wire inserting portion 50.

Subsequently, as shown in FIG. 15, the jig 45 is pressed against the jig contact portion 46 from behind to move the slide portion 16 relatively forward with respect to the terminal body 15. At this time, the locking of the locking projection 28 of the terminal body 15 and the temporary lock receiving portion 26 of the slide portion 16 is released and the side wall of the slide portion 16 rides on the locking projection 28 and is expanded and deformed.

If the jig contact portion 46 is pushed further forward by the jig 45, the side wall of the slide portion 16 is restored and the locking projection 28 of the terminal body 15 and the complete lock receiving portion 27 of the slide portion 16 are resiliently locked. In this way, the slide portion 16 is held at the pressing position with respect to the terminal body 15.

When the slide portion 16 moves to the pressing position with respect to the terminal body 15, the upper pressing portion 25A of the slide portion 16 comes into contact with the upper connecting piece 18A of the terminal body 15 from above and presses the upper connecting piece 18A downward. Further, the lower pressing portion 25B of the slide portion 16 comes into contact with the lower connecting piece 18B of the terminal body 15 from below and presses the lower connecting piece 18B upward. In this way, the core wire 13 is vertically sandwiched by the upper and lower connecting pieces 18A, 18B and the wire 11 and the terminal 12 are electrically connected (see FIG. 16).

With the core wire 13 vertically sandwiched by the upper and lower connecting pieces 18A, 18B, the core wire 13 is sandwiched by the upper holding protrusion 23A of the upper connecting piece 18A and the lower holding protrusion 23B of the lower connecting piece 18B, thereby being held in a state extending in the front-rear direction and bent in the vertical direction. In this way, the terminal 12 can firmly hold the core wire 13 (see FIG. 16).

Subsequently, when the rear holder 31 is pressed forward, the lock receiving portions 38 of the rear holder 31 ride on the complete locking portions 37 of the connector housing 30 and are resiliently deformed. If the rear holder 31 is pressed further forward, the complete locking portions 37 and the lock receiving portions 38 are locked. In this way, the rear holder 31 is held at the complete locking position with respect to the connector housing 30 (see FIG. 1). In the above way, the manufacturing of the connector 10 is completed.

[Terminal Repair Operation]

Next, an example of a repair operation of the terminal 12 in the connector 10 of this embodiment. Note that the repair of the terminal 12 is the placement of the terminal 12 troubled in the connector 10 by a new terminal 12.

First, the rear holder 31 is removed from the connector housing 30. The locking of the complete locking portions 37 and the temporary locking portions 36 is released by deflecting the lock receiving portions 38 of the rear holder 31 outward, and the rear holder 31 is moved rearward (see FIG. 17).

As shown in FIG. 18, with the rear holder 31 moved rearward from the temporary locking position, the space behind the terminal accommodating portion 29 can be used. Thus, the core wire 31 led out from the terminal 12 to be repaired can be cut and the terminal 12 to be repaired can be taken out from the terminal accommodating portion 29. Subsequently, the new terminal 12 is accommodated into the terminal accommodating portion 29 and the connector 10 is configured again in a manner similar to that of the above manufacturing method.

In this embodiment, as shown in FIG. 14, the guide portion 55 having a part with the opening diameter smaller than the outer diameter of the wire 11 is constituted by the first inner wall 55A on the side of the connector housing 30 and the second inner wall 55B on the side of the rear holder 31. Thus, if the rear holder 31 is moved rearward with respect to the connector housing 30 as shown in FIG. 18, the second inner wall 55B moves rearward, but the position of the first inner wall 55A remains unchanged. That is, the entire guide portion 55 is not moved with respect to the wire 11, but only the second inner wall 55B, which is a part of the guide portion 55, moves. Thus, the insulation coating 14 of the wire 11 hardly interferes with the guide portion 55.

Further, since the wire receiving space 58 is provided behind the first inner wall 55A of the connector housing 30 in this embodiment as shown in FIG. 18, even if the rear holder 31 is moved rearward, the wire 11 escapes into the wire receiving space 58, whereby the interference of the second inner wall 55B and the insulation coating 14 of the wire 11 is further suppressed. Therefore, in the connector 10, the rear holder 31 can be easily removed from the connector housing 30 and, for example, the repair operation of the terminal 12 described above can be successfully performed.

Functions and Effects of First Embodiment

According to the first embodiment, the following functions and effects are achieved.

The connector 10 according to the first embodiment is to be connected to the wires 11 each including the core wire 13 and the insulation coating 14 covering the outer periphery of the core wire 13 and extending in the front-rear direction, and is provided with the terminals 12 to be connected to the core wires 13, the connector housing 30 including the terminal accommodating portions 29 for accommodating the terminals 12 inside, and the rear holder 31 to be mounted on the rear part of the connector housing 30. The terminal 12 includes the core wire insertion opening 54, into which the core wire 13 is inserted from behind, the electrically connecting portion 18 to be electrically connected to the core wire 13 and the pressing portion 25 for pressing the core wire 13 inserted through the core wire insertion opening 54 and disposed at the position of the electrically connecting portion 18 in the front-rear direction against the electrically connecting portion 18. The wire inserting portions 50, into which the wires 11 are inserted, are constituted by the connector housing 30 and the rear holder 31. The wire inserting portion 50 includes the guide portion 55 for guiding the insertion of the core wire 13 into the core wire insertion opening 54 of the terminal 12 accommodated inside the terminal accommodating portion 29. The guide portion 55 is constituted by the first inner wall 55A provided in the connector housing 30 and the first inner wall 55B provided in the rear holder 31.

According to the above configuration, the insertion of the core wire 13 into the core wire insertion opening 54 of the terminal 12 accommodated in the connector housing 30 can be guided by the guide portion 55. Further, since the guide portion 55 is constituted by the first inner wall 55A provided in the connector housing 30 and the second inner wall 55B provided in the rear holder 31, the rear holder 31 is easily removed from the connector housing 30.

In the first embodiment, the minimum opening diameter of the guide portion 55 is smaller than the opening diameter of the core wire insertion opening 54 and larger than the diameter of the core wire 13.

According to the above configuration, the core wire 13 is easily guided into the core wire insertion opening 54 by the guide portion 55.

In the first embodiment, the connector housing 30 includes the wire receiving spaces 58 behind the first inner walls 55A, and the interference of the insulation coatings 14 of the wires 11 with the second inner walls 55B when the rear holder 31 is moved rearward is suppressed by accommodating the wires 12 into the wire receiving spaces 58.

According to the above configuration, the rear holder 31 is easily removed from the connector housing 30 by moving the rear holder 31 rearward.

In the first embodiment, the first inner wall 55A includes the conical portion 56 disposed such that the opening diameter of the guide portion 55 is reduced toward the front side.

According to the above configuration, the core wire 13 is easily guided into the core wire insertion opening 54 by the conical portion 56.

In the first embodiment, the second inner wall 55B is disposed such that the opening diameter of the guide portion 55 is reduced toward the front side and has the flat inclined surface 57 intersecting the axis extending in the front-rear direction, the rear holder 31 has the locking surface 43 to be locked to the rear end part of the terminal 12, and the inclined surface 57 and the locking surface 43 are disposed side by side in the front-rear direction.

According to the above configuration, since the inclined surface 57 and the locking surface 43 are disposed side by side in the front-rear direction, a shear cross-sectional area of the locking surface 43 by the terminal 12 is easily increased.

In the first embodiment, the terminal 12 is provided with the terminal body 15 including the electrically connecting portion 18 and the slide portion 16 including the core wire insertion opening 54 and the pressing portion 25 and movable in the front-rear direction with respect to the terminal body 15.

According to the above configuration, the electrically connecting portion 18 can be pressed against the wire 11 and the wire 11 and the terminal 12 can be electrically connected by moving the slide portion 16 in the front-rear direction.

In the first embodiment, the slide portion 16 is movable between the pressing position where the electrically connecting portion 18 is pressed against the core wire 13 by the pressing portion 25 and the separated position disposed rearward of the pressing position, the pressing portion 25 being separated from the electrically connecting portion 18 at the separated position.

According to the above configuration, the wire 11 and the terminal 12 can be electrically connected by moving the slide portion 16 from the separated position to the pressing position with respect to the terminal body 15.

In the first embodiment, the rear holder 31 is movable in the front-rear direction with respect to the connector housing 30, the rear holder 31 is movable between the temporary locking position where the guide portion 55 is constituted by the first and second inner walls 55A, 55B and the complete locking position disposed forward of the temporary locking position, and the rear holder 31 has the locking surface 43 to be locked to the rear end part of the slide portion 16 disposed at the pressing position with the rear holder 31 held at the complete locking position.

According to the above configuration, since the rear holder 31 is movable in the front-rear direction between the temporary locking position and the complete locking position, the terminal 12 connected to the wire 11 can be locked and retained by moving the slide portion 16 in the front-rear direction.

In the first embodiment, the slide portion 16 is formed into a tubular shape extending in the front-rear direction, and the guiding portions 47 projecting inwardly of the slide portion 16 toward the front side and configured to guide the core wire 13 into the slide portion 16 by sliding in contact with the core wire 13 are provided at the positions near the rear end part of the slide portion 16.

According to the above configuration, the core wire 13 can be easily inserted into the slide portion 16 by the guiding portions 47.

In the first embodiment, the slide portion 16 is provided with the jig contact portion 46 projecting outward, and the slide portion 16 is slid forward by the jig contact portion 46 being pressed rearward by the jig 45.

According to the above configuration, the wire 11 and the terminal 12 can be electrically connected by bringing the jig 45 into contact with the jig contact portion 46 and pressing the slide portion 16 forward.

Second Embodiment

A second embodiment of the present disclosure is described with reference to FIGS. 19 to 23. Since a connector 110 according to the second embodiment is configured substantially similarly to the connector of the first embodiment except the configuration of wire inserting portions 150 constituted by a connector housing 130 and a rear holder 131, the same members as in the first embodiment and functions and effects thereof are not described. Note that, for a plurality of identical members, only some members may be denoted by a reference sign and the other members may not be denoted by the reference sign.

Figure 19:
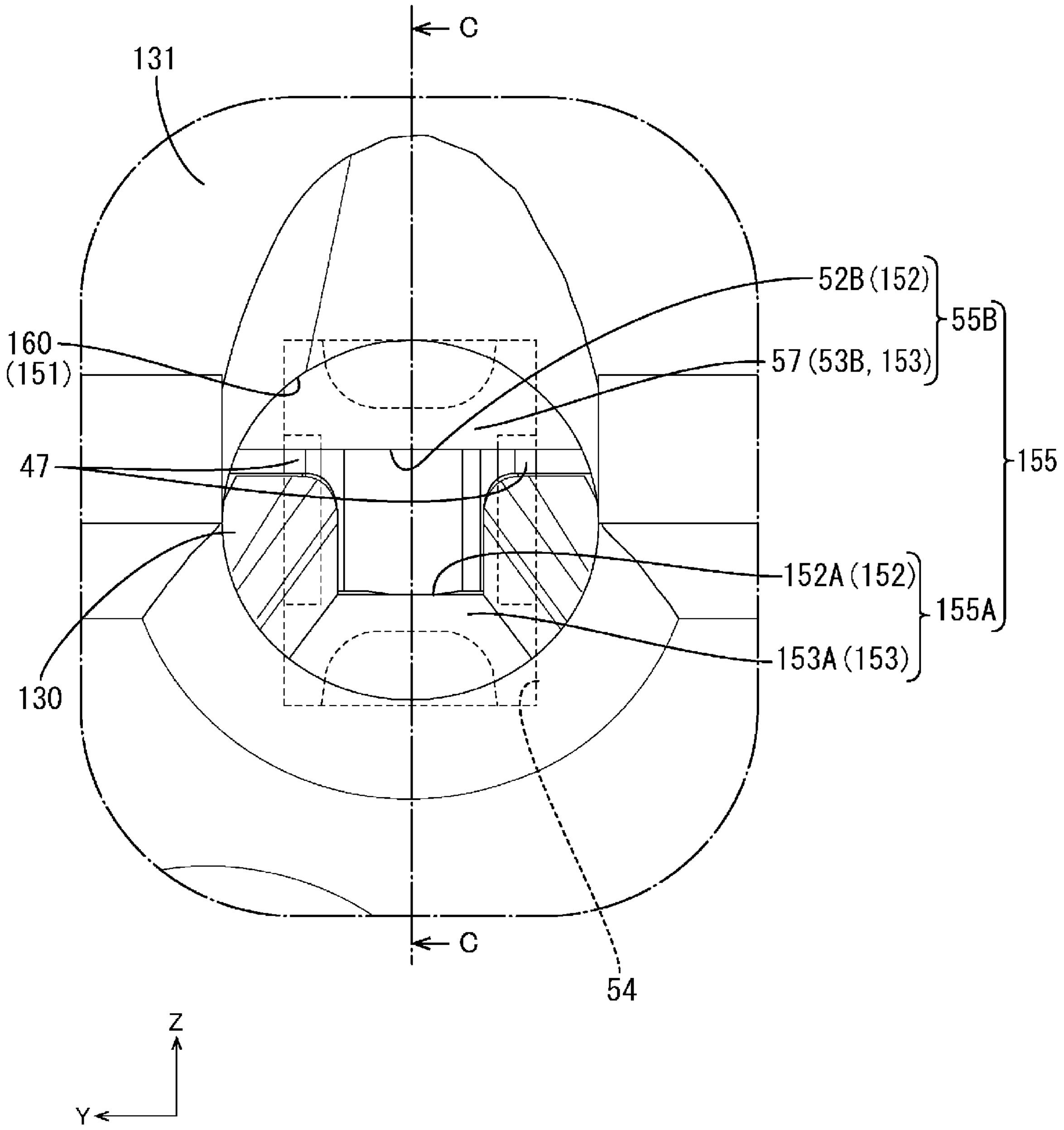
FIG. 19 is an enlarged back view showing a state where a rear holder is held at a temporary locking position on a connector housing according to a second embodiment.
Figure 20:
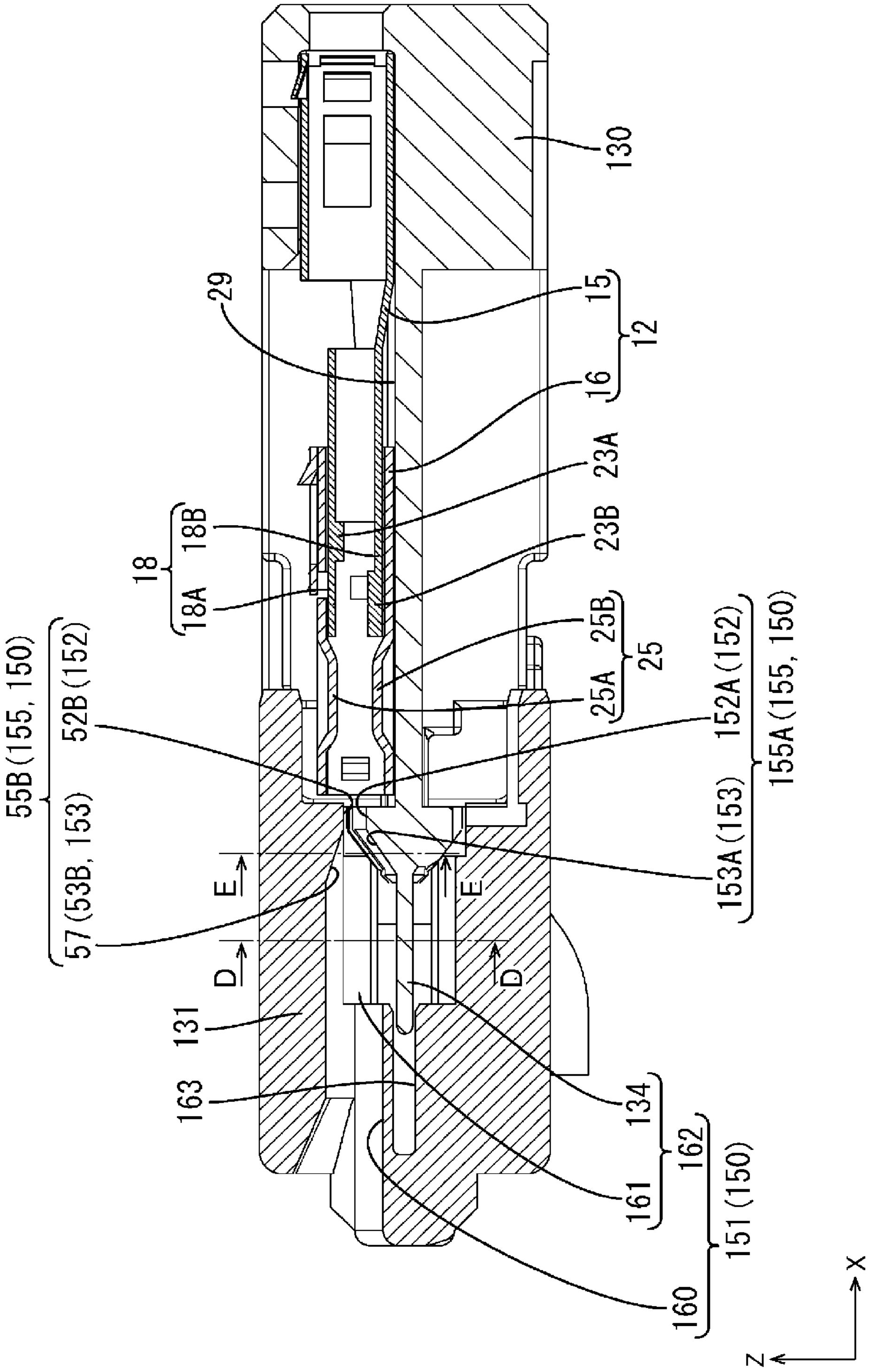
FIG. 20 is a section along C-C of FIG. 19.
Figure 21:
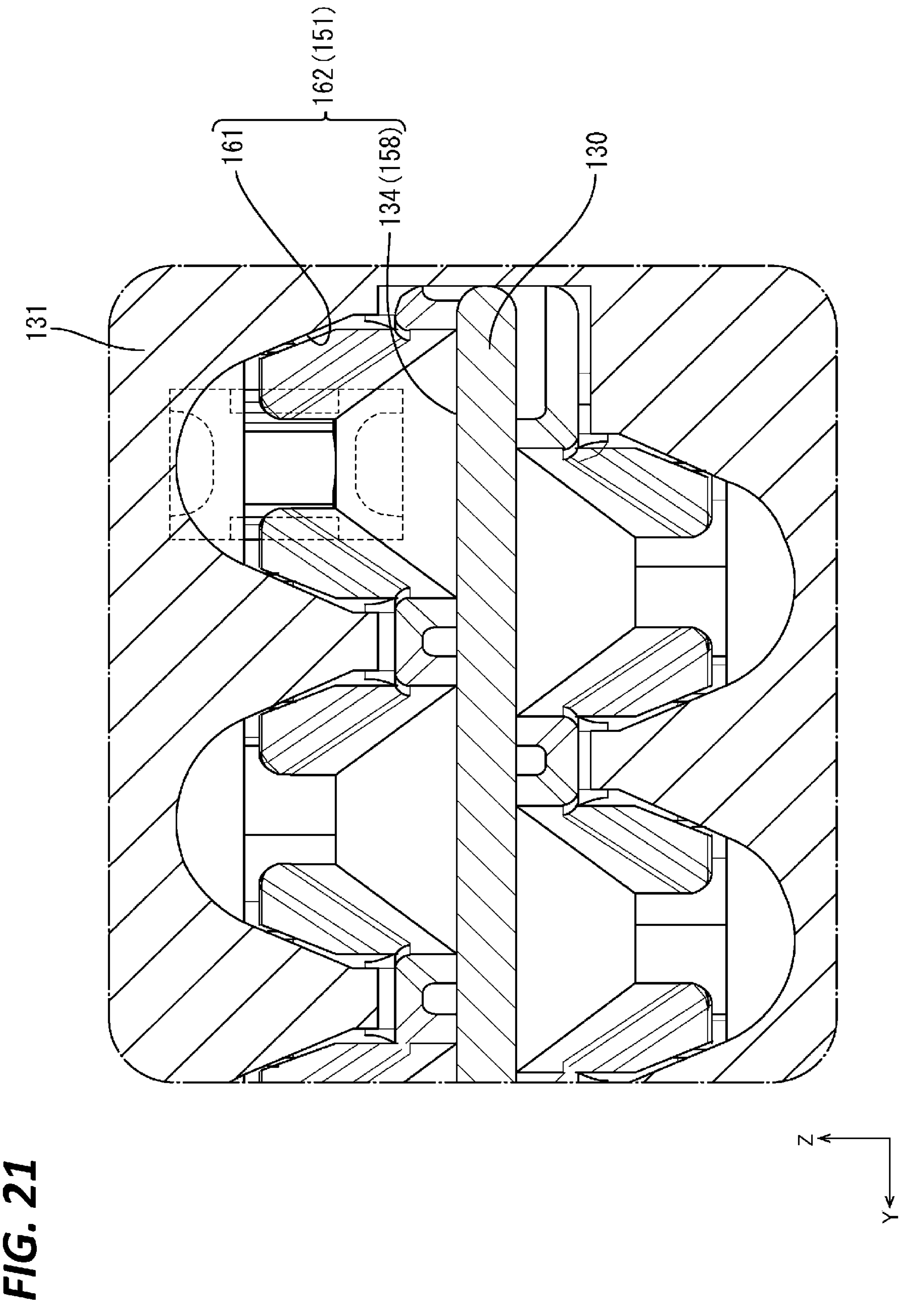
FIG. 21 is a section along D-D of FIG. 20.
Figure 23:
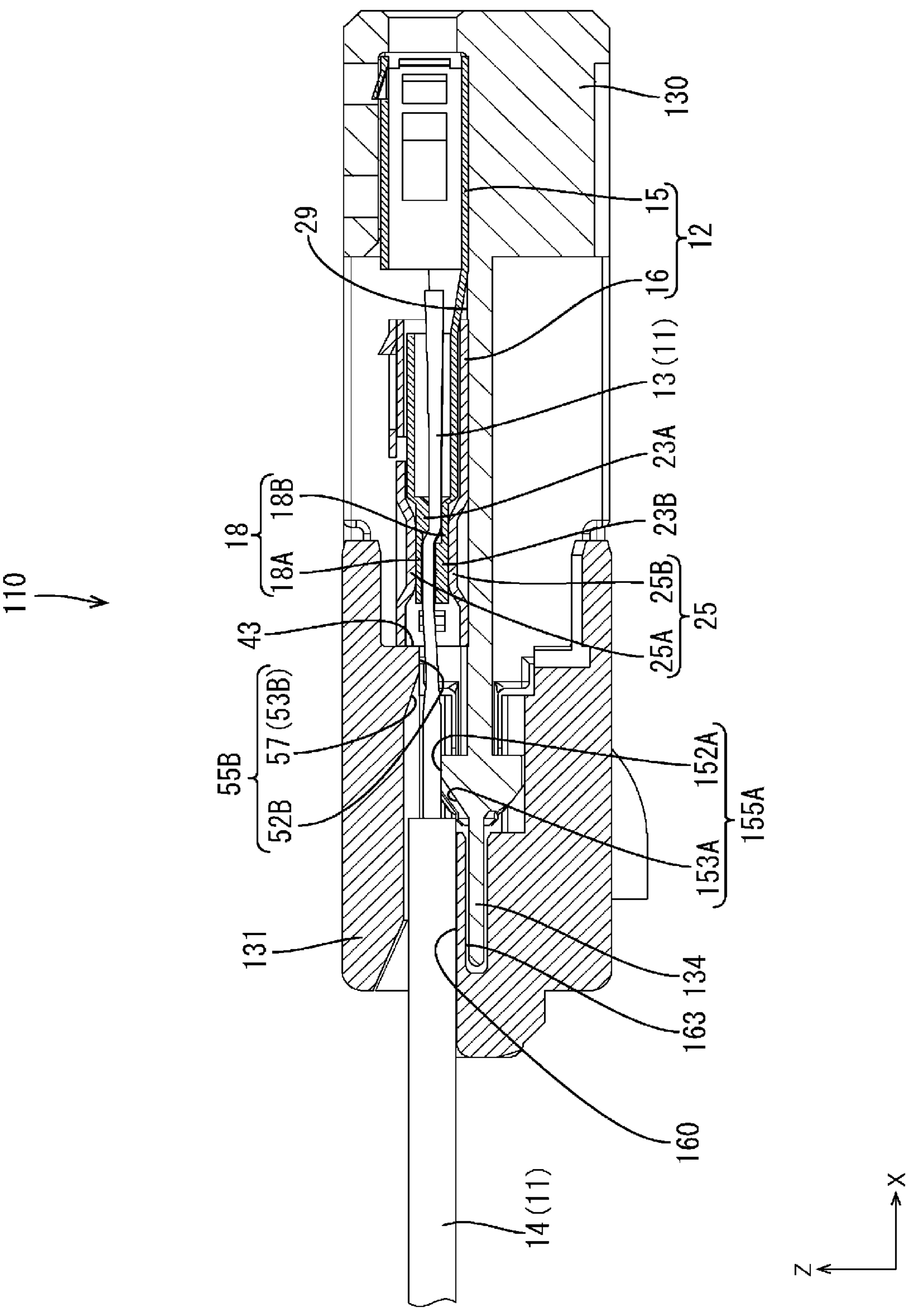
FIG. 23 is a section along C-C of FIG. 19 of a connector.

As shown in FIGS. 19 and 20, a rear part of a large-diameter portion 151 of the wire inserting portion 150 serves as a rear large-diameter portion 160, which is an inner wall of a through hole constituted only by the rear holder 131. As shown in FIG. 21, a front part of the large-diameter portion 151 serves as a front large-diameter portion 162 constituted by a separation wall 134 of the connector housing 130 and a partitioning portion 161 provided in the rear holder 131. The upper and lower surfaces of the separation wall 134 of the connector housing 130 are flat without having a groove-like shape. As shown in FIG. 23, the separation wall 134 is accommodated inside a separation wall accommodation recess 163 provided in the rear holder 131 with the rear holder 131 disposed at a complete locking position.

As shown in FIG. 20, the front large-diameter portion 162 (see FIG. 21) has an internal space expanding downward as compared to the rear large-diameter portion 160 (see FIG. 19). That is, as shown in FIG. 21, the connector housing 130 constituting lower parts of the front large-diameter portions 162 has wire receiving spaces 158 above the separation wall 134.

As shown in FIG. 19, the small-diameter portion 152 of the wire inserting portion 150 has a substantially rectangular shape in a back view and composed of a first small-diameter portion 152A provided on the side of the connector housing 130 and a second small-diameter portion 52B provided on the side of the rear holder 131. The first small-diameter portion 152A is gate-shaped.

As shown in FIG. 20, a reduced-diameter portion 153 of the wire inserting portion 150 includes a first reduced-diameter portion 153A provided on the side of the connector housing 130 and a second reduced-diameter portion 53B (inclined surface 57) provided on the side of the rear holder 131. A first inner wall 155A is constituted by the first small-diameter portion 152A and the first reduced-diameter portion 153A. A second inner wall 55B is constituted by the second small-diameter portion 52B and the second reduced-diameter portion 53B. When the rear holder 131 is at a temporary locking position, a guide portion 155 is constituted by the first and second inner walls 155A, 55B.

Figure 22:
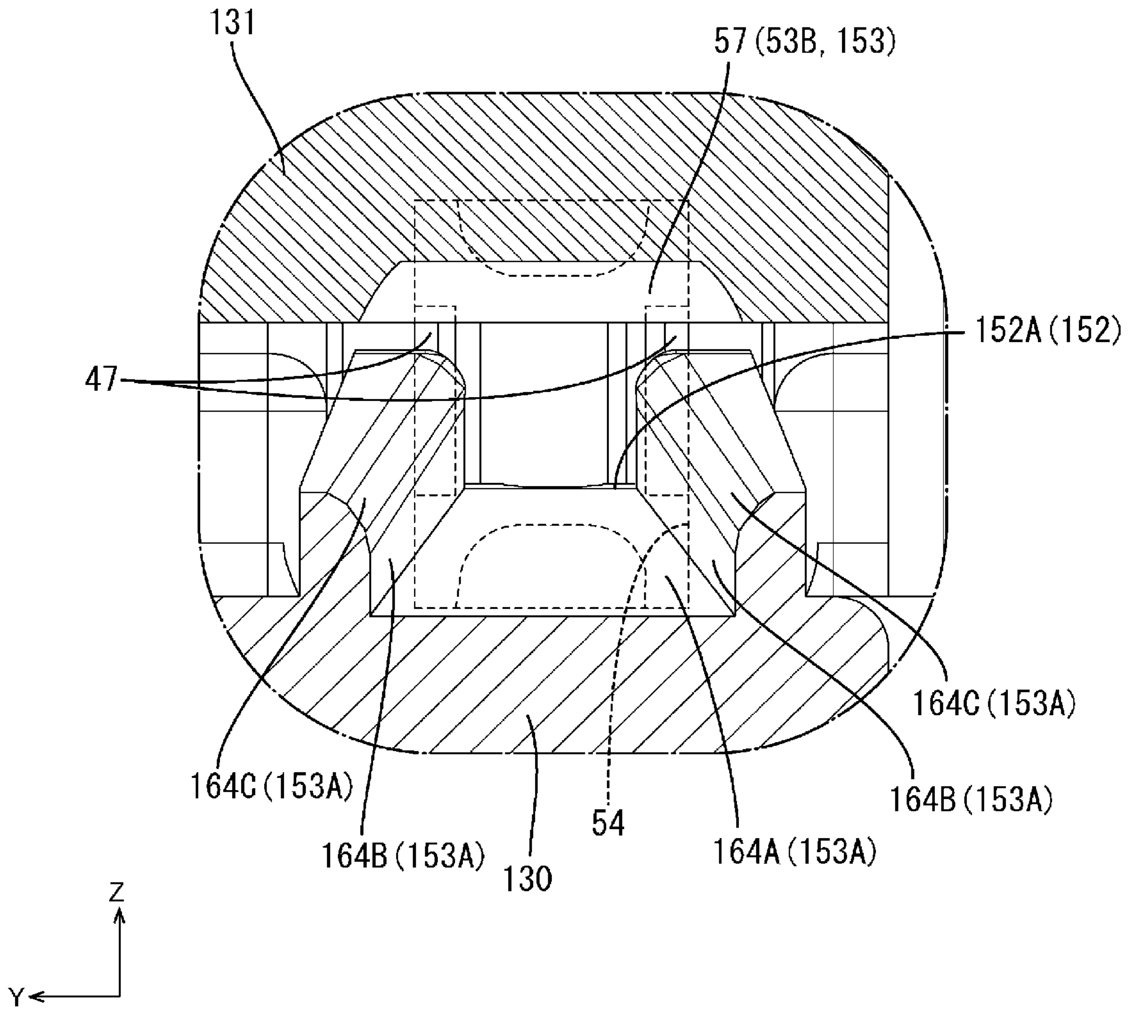
FIG. 22 is a section along E-E of FIG. 20.

Although the first reduced-diameter portion 53A of the first embodiment is the conical portion 56 in the form of a curved surface (see FIG. 13), the first reduced-diameter portion 153A according to the second embodiment has a plurality of inclined surfaces 164A, 64B and 164C as shown in FIG. 22. Each of the plurality of inclined surfaces 164A, 164B and 164C is inclined to approach a central part of the small-diameter portion 152 toward the front side. For example, the inclined surface 164A located in a lateral center is inclined upward toward the front side. The inclined surface 164B on the right side of the inclined surface 164A is inclined leftward toward the front side.

By configuring the first reduced-diameter portion 153A to have the plurality of inclined surfaces 164A, 164B and 164C in this way, the core wire 13 is more easily guided into the small-diameter portion 152 (consequently into the core wire insertion opening 54) as compared to the case where a first reduced-diameter portion is constituted by one (flat) inclined surface.

Other Embodiments (1) Although the guide portion 55, 155 includes the small-diameter portion 52, 152 and the reduced-diameter portion 53, 153 in the above embodiments, there is no limitation to this and a guide portion may include only a reduced-diameter portion without including a small-diameter portion.

(2) Although the rear holder 31, 131 is held at the temporary locking position and the complete locking position on the connector housing 30, 130 in the above embodiments, there is no limitation to this and a rear holder may be held at one locking position on a connector housing.

(3) Although the electrically connecting portion 18 is pressed against the core wire 13 by moving the slide portion 16 in the front-rear direction with respect to the terminal body 15 in the above embodiments, there is no limitation to this. For example, a terminal may include a terminal body and a cover portion to be assembled with the terminal body from above, and a core wire may be sandwiched by a pressing portion of the cover portion and an electrically connecting portion.

LIST OF REFERENCE NUMERALS

10, 110: connector
11: wire
12: terminal
13: core wire
14: insulation coating
15: terminal body
16: slide portion
17: connecting tube portion
18: electrically connecting portion
18A: upper connecting piece
18B: lower connecting piece
20: base portion
21: locking lance
23A: upper holding protrusion
23B: lower holding protrusion
25: pressing portion
25A: upper pressing portion
25B: lower pressing portion
26: temporary lock receiving position
27: complete lock receiving position
28: locking projection
29: terminal accommodating portion
30, 130: connector housing
31, 131: rear holder
32: body portion
33: locking wall
34, 134: separation wall
36: temporary locking position
37: complete locking position
38: lock receiving portion
40: front stop portion
41: receptacle
43: locking surface
45: jig
46: jig contact portion
47: guiding portion
50, 150: wire inserting portion
50A: first wire inserting portion
50B: second wire inserting portion
51, 151: large-diameter portion
51A: first large-diameter portion
51B: second large-diameter portion
52, 152: small-diameter portion
52A, 152A: first small-diameter portion
52B: second small-diameter portion
53, 153: reduced-diameter portion
53A, 153A: first reduced-diameter portion
53B: second reduced-diameter portion
54: core wire insertion opening
55, 155: guide portion
55A, 155A: first inner wall
55B: second inner wall
56: conical portion
57: inclined surface
58, 158: wire receiving space
160: rear large-diameter portion
161: partitioning portion
162: front large-diameter portion
163: separation wall accommodation recess
164A, 164B, 164C: plural inclined surfaces

What is claimed is:

1. A connector to be connected to a wire including a core wire and an insulation coating covering an outer periphery of the core wire and extending in a front- rear direction, comprising:

a terminal to be connected to the core wire;

a connector housing including a terminal accommodating portion for accommodating the terminal inside; and a rear holder to be mounted on a rear part of the connector housing, the terminal including a core wire insertion opening, the core wire being inserted into the core wire insertion opening from behind, an electrically connecting portion to be electrically connected to the core wire and a pressing portion for pressing the core wire inserted through the core wire insertion opening and disposed at a position of the electrically connecting portion in the front-rear direction against the electrically connecting portion, a wire inserting portion being constituted by the connector housing and the rear holder, the wire being inserted into the wire inserting portion, the wire inserting portion including a guide portion for guiding insertion of the core wire into the core wire insertion opening of the terminal accommodated inside the terminal accommodating portion, and the guide portion being constituted by a first inner wall provided in the connector housing and a second inner wall provided in the rear holder, the guide portion being configured to guide the core wire only when the rear holder is in a temporary-lock position, the guide portion disappearing when the rear holder moves to a complete- lock position, and the connector housing including a wire receiving space located behind the first inner wall to suppress interference between the insulation coating of the wire and the second inner wall when the rear holder is moved rearward.

2. The connector of claim 1, wherein a minimum opening diameter of the guide portion is smaller than an opening diameter of the core wire insertion opening and larger than a diameter of the core wire.

3. The connector of claim 1, wherein at least one of the first and second inner walls includes a conical portion disposed to reduce an opening diameter of the guide portion toward a front side.

4. The connector of claim 1, wherein:

at least one of the first and second inner walls has a flat inclined surface disposed to reduce an opening diameter of the guide portion toward a front side and intersecting an axis extending in the front-rear direction, at least one of the connector housing and the rear holder has a locking surface to be locked to a rear end part of the terminal, and the inclined surface and the locking surface are disposed side by side in the front-rear direction.

5. The connector of claim 1, wherein the terminal is provided with a terminal body including the electrically connecting portion and a slide portion including the core wire insertion opening and the pressing portion and movable in the front-rear direction with respect to the terminal body.

6. The connector of claim 5, wherein the slide portion is movable between a pressing position where the electrically connecting portion is pressed against the core wire by the pressing portion and a separated position disposed rearward of the pressing portion, the pressing portion being separated from the electrically connecting portion at the separated position.

7. The connector of claim 6, wherein:

the rear holder is movable in the front-rear direction with respect to the connector housing, the rear holder is movable between a temporary locking position where the guide portion is constituted by the first and second inner walls and a complete locking position disposed forward of the temporary locking position, and the rear holder has a locking surface to be locked to a rear end part of the slide portion disposed at the pressing position with the rear holder disposed at the complete locking position.

8. The connector of claim 5, wherein:

the slide portion is formed into a tubular shape extending in the front-rear direction, and a guiding portion projecting inwardly of the slide portion toward a front side and configured to guide the core wire into the slide portion by sliding in contact with the core wire is provided at a position near a rear end part of the slide portion.

9. The connector of claim 5, wherein:

the slide portion is provided with a jig contact portion projecting outward, and the slide portion is slid forward by the jig contact portion being pressed from behind by a jig.

* * * * *